United States Patent [19]

Sakaguchi et al.

[11] Patent Number: 5,625,771
[45] Date of Patent: Apr. 29, 1997

[54] METHOD FOR MAKING CURSOR FORM

[75] Inventors: Toshiaki Sakaguchi, Yao; Hiroyuki Okuda, Ikeda, both of Japan

[73] Assignee: Hitachi, Ltd., Tokyo, Japan

[21] Appl. No.: 144,838

[22] Filed: Oct. 28, 1993

[30] Foreign Application Priority Data

Nov. 4, 1992 [JP] Japan .................. 4-319454

[51] Int. Cl.⁶ .................................. G09G 5/08
[52] U.S. Cl. .................................. 395/762
[58] Field of Search .................... 395/148, 149, 395/155, 161, 147; 364/419.2; 345/145; 434/150, 153

[56] References Cited

U.S. PATENT DOCUMENTS

| | | | |
|---|---|---|---|
| 4,789,962 | 12/1988 | Berry et al. | 364/900 |
| 4,974,170 | 11/1990 | Bouve et al. | 364/518 |
| 4,984,152 | 1/1991 | Muller | 395/153 |
| 4,996,645 | 2/1991 | Schneyderberg Van Der Zon | 364/449 |
| 5,142,662 | 8/1992 | Gump et al. | 395/100 |
| 5,262,760 | 11/1993 | Iwamura et al. | 345/145 |
| 5,275,568 | 1/1994 | Pfuetze | 434/153 |
| 5,287,448 | 2/1994 | Nicol et al. | 395/159 |
| 5,289,572 | 2/1994 | Yano et al. | 395/155 |
| 5,362,239 | 11/1994 | Pfuetze | 434/153 |
| 5,442,742 | 8/1995 | Greyson et al. | 395/146 |
| 5,444,828 | 8/1995 | Kataoka | 395/117 |

FOREIGN PATENT DOCUMENTS 3-233680  6/1991  Japan .

Primary Examiner—Mark K. Zimmerman
Assistant Examiner—Cliff N. Vo
Attorney, Agent, or Firm—Fay, Sharpe, Beall, Fagan, Minnich & McKee

[57] ABSTRACT

A cursor form is created for linking parts of a displayed image with corresponding entries of a table. When setting a link by designating a cursor on the display screen, a cursor for designating the location where a link is to be set surely and quickly is provided. Table data of the table (for example, a residents information table) consisting of image data (for example, a map) and a plurality of entries for setting links to this image data are displayed on the output device, and a mark which is the same as that of a predetermined item in the entry selected to set a link from the display table is designated by the cursor on a display image. When obtaining the location information on said designated image having the same mark, the data of a predetermined item among the entry data selected from the table is converted to image data, and the cursor form data is constituted. Thereafter, a cursor having this form is displayed on the display image, and a user sets a link between the image data and table data using this cursor.

6 Claims, 28 Drawing Sheets

FIG. 1

| FILE | LINK EDITING | LINK RETRIEVING | END |

DISTRICT ○○ | SETTING | SUCCESSIVE SETTING | END OF EDITION

RESIDENTS INFORMATION

| HOUSEHOLDER | ADDRESS | AGE | FAMILY SIZE |
|---|---|---|---|
| 村上 治幸 | 2-3 | 25 | 3 |
| 山本 隆 | 2-4 | 32 | 4 |
| 佐藤 華 | 2-5 | 53 | 6 |
| 斎藤 博 | 2-6 | 74 | 2 |
| 中村 春雄 | 2-7 | 43 | 1 |

104
102

MAP OF SURROUNDING AREAS

| | FILE | LINK EDITING | LINK RETRIEVING | END | |
|---|---|---|---|---|---|

DISTRICT ○○ | SETTING / SUCCESSIVE SETTING / END OF EDITION

RESIDENTS INFORMATION

| HOUSEHOLDER | ADDRESS | AGE | FAMILY SIZE |
|---|---|---|---|
| 村上 治幸 | 2-3 | 25 | 3 |
| 山本 隆 | 2-4 | 32 | 4 |
| 佐藤 肇 | 2-5 | 53 | 6 |
| 斎藤 博 | 2-6 | 74 | 2 |
| 中村 春雄 | 2-7 | 43 | 1 |

MAP OF SURROUNDING AREAS

RESIDENT: MAY YOU CHANGE THE LINK INFORMATION OF 山本 ?

EXECUTE    CANCEL

FIG. 19

| FILE | LINK EDITING | LINK RETRIEVING | END |

DISTRICT ○○

SETTING
SUCCESSIVE SETTING
END OF EDITION

RESIDENTS INFORMATION

| HOUSEHOLDER | ADDRESS | AGE | FAMILY SIZE |
|---|---|---|---|
| 村上 治幸 | 2-3 | 25 | 3 |
| 山本 隆 | 2-4 | 32 | 4 |
| 佐藤 肇 | 2-5 | 53 | 6 |
| 斎藤 博 | 2-6 | 74 | 2 |
| 中村 睿雄 | 2-7 | 43 | 1 |

MAP OF SURROUNDING AREAS

伊藤和男 1 | 高橋豊 2 | 村上 治幸 3 | 佐藤 肇 5 | 中村 睿雄 7
山本 隆 4 | 佐藤 斎藤博 6
山本町1丁目 ②
木下 高雄 11 | 山下 泰裕 9 | 木下 弘美 8
田中 健 10

ITEM : MAY YOU CHANGE THE LINK INFORMATION OF [佐藤] ?

| EXECUTE | CANCEL |

FIG. 24

| | FILE | LINK EDITING | LINK RETRIEVING | END |

DISTRICT ○○
SETTING
SUCCESSIVE SETTING
END OF EDITION

RESIDENTS INFORMATION

| HOUSEHOLDER | ADDRESS | AGE | FAMILY SIZE |
|---|---|---|---|
| 中村 春雄 | 2-7 | 43 | 1 |
| 木下 弘美 | 2-8 | 32 | 4 |
| 山下 泰裕 | 2-9 | 53 | 6 |
| 田中 健 | 2-10 | 74 | 2 |
| 木下 高雄 | 2-11 | 43 | 1 |

2402

2404

MAP OF SURROUNDING AREAS

| 伊藤和男 1 | 高橋 豊 2 | 村上 治幸 3 | 佐藤 肇 5 | 中村 春雄 7 |
| | | 山本 隆 4 | 斎藤 博 6 | |

山本町1丁目

| 木下 高雄 11 | 山下 泰裕 9 | ② 木下 弘美 8 |
| | 田中 健 10 | |

木下弘 ← 2406

METHOD FOR MAKING CURSOR FORM

BACKGROUND OF THE INVENTION

The present invention relates to a system for interactively relating among a plurality of data in a computer such as a hypertext system or a map information system and relates to a method for making the cursor form which is suitable to reduce the load of the operation for making relation among the displayed data and to improve the efficiency of the operation for making relation among the displayed data with the cursor.

In a general hypertext system, to relate two texts, the locations of both texts are designated by a user on the screen.

A general map information system provides a function for illustrating each resident and his address and the distribution of aged persons on the map. For example, a system for displaying the distribution of attribute information on the map is proposed in Japanese Patent Application Laid-Open No. 3-233680. For such illustration, it is necessary to define the relationship between residents information and map information, that is, locations on the map where residents live beforehand.

In a system which requires interactive relating among data in a computer as mentioned above, a method for displaying each data on the display unit of the computer and designating (selecting) data to be related from a coordinate input device such a mouse by a user is used. In a conventional system, as a method for designating data to be related, a method for displaying a figure with a fixed arrow on the display unit by user's operation and by moving the figure onto the data to be related, for selecting the relevant data is used.

According to the prior art, when the locations of two parts to be linked on the screen are designated by a user, the two parts are generally farther away from each other on the screen, so that during designation of the other after one is designated, the line of sight of the user moves. Therefore, the user may forget the contents which are designated first and designate another incorrect location or may check the forgotten contents and then designate the other, causing incorrect designation or extra time.

SUMMARY OF THE INVENTION

An object of the present invention is to eliminate the difficulties of the prior art mentioned above and to provide a method for designating link setting locations surely and quickly on the screen.

In a data processing system which displays table data consisting of image data and a plurality of entries for setting links to image data on the display unit, designates the same display as the display of a predetermined item among the entries which is selected by a user from the display table so as to set the links on the displayed image by the cursor, and obtains the location information on the image on the designated same display, the following processing is performed.

When an entry is selected from the table by the user, the data of the selected entry is read from the storage, and the data of the predetermined item among the data of the read entry is converted to image data and displayed as cursor form data, and the cursor form data is stored in the cursor form data storage region of the memory.

Characters of a predetermined number are picked up from the beginning of the character string of a predetermined item among the read entry data, and the picked-up character string is compared with character strings of the predetermined item of other entries in the table one by one, and when the same character string is not found, the picked up character string is converted to image data and displayed as cursor form data. When the same character string exists, a character string of a number which is more than the predetermined number of characters by one is picked up from the beginning of the character string of the predetermined item among the read data and the picked-up character string is converted to image data and displayed as cursor form data.

When an entry is selected from the table by the user, the cursor is displayed in a different display status, for example, in color depending on whether a link is already set to the selected entry or not. When an instruction for changing an item of the entry to another item is inputted from the input device, the cursor form data which is already stored in correspondence with the item before changing is changed to new cursor form data which is converted from the data of the other item to which the above changing is designated.

The present invention is a suitable method for making the cursor form particularly when image data is used as map data.

By displaying the character string of a predetermined item of an entry, which is selected by the user to set links with image data, on the cursor, the character string on the cursor and the character string displayed on the screen can be seen at a short distance. As a result, when the user designates a character string which is the same as the character string displayed on the screen, the line of sight moves little and the possibility of setting an incorrect link location is reduced. Furthermore, even if the user forgets the contents which are designated first by him, there is no need to look back at the location where the contents are written each time and the link setting operation can be performed quickly.

BRIEF DESCRIPTION OF THE DRAWINGS

FIG. 1 is an illustration showing an embodiment of cursor form making when the present invention is applied to a map information system.

FIG. 17 shows a link setting screen.

FIG. 19 shows a link successive setting screen.

FIG. 24 shows the first embodiment of cursor form making.

DESCRIPTION OF THE PREFERRED EMBODIMENT

Figure 2:
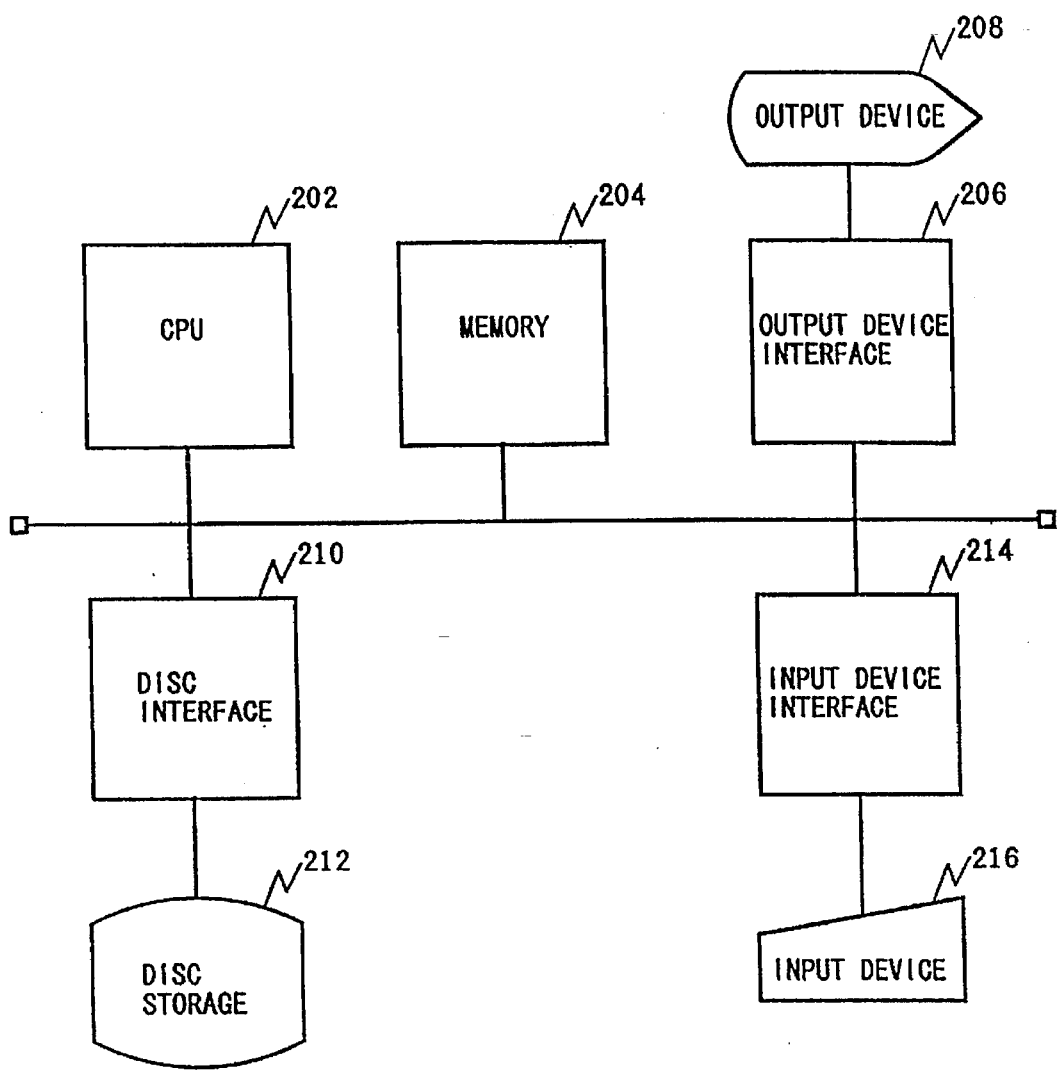
FIG. 2 is a block diagram showing the hardware configuration used by a map information system which is an embodiment of the present invention.

An embodiment of cursor form making when the present invention is applied to a map information system will be explained with reference to FIG. 1. The screen shown in FIG. 1 shows a scene that a user selects a residents entry (104) from residents information (102) and designates the place of residence of the residents on the map. On the map, the name of the householder living at each address is entered like "﹎" (106). In this case, at a cursor (108) for designating the coordinates corresponding to the place of residence of the residents on the map, a part of the name of the householder of the selected residents entry (104) is displayed. By moving the cursor (108) displayed in FIG. 1 on the screen of an output device (208) using an input device (216) such as a mouse by the user, desired location coordinates can be obtained. According to the present invention, information on coordinates where a link is to be set is displayed on the cursor. Therefore, the coordinates where a link is to be set can be designated surely and quickly. A map information system having the aforementioned function will be explained hereafter. The embodiments which will be described below can be applied to image information other than a map.

FIG. 2 is a block diagram of the hardware configuration used by a map information system which is an embodiment of the present invention. A CPU (202) operates according to the program stored in a memory (204), performs arithmetic on data stored in the memory (204) or data inputted from the input device (216) via an input device interface (214), writes the result into the memory (204), displays the result onto the output device (208) via an output device interface (206), or writes/reads data stored in a disk storage (212) via a disk interface (210).

Figure 3:
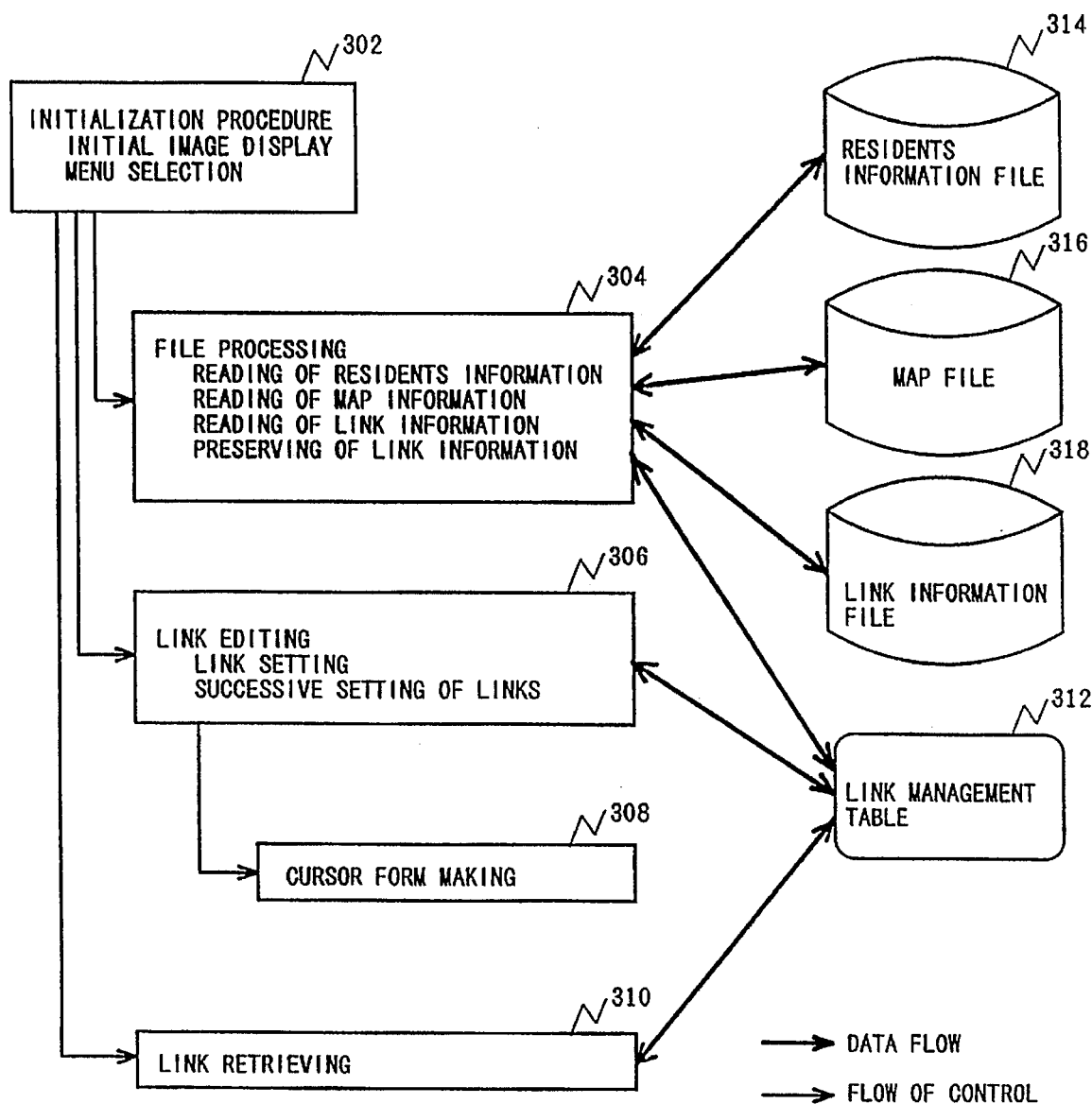
FIG. 3 is a block diagram showing the software configuration of this embodiment.

FIG. 3 shows the software configuration of this embodiment. Each module is executed by the CPU (202), and file data is stored in the disk storage (212), and a table (312) is stored in the memory (204).

The program consists of an initialization module (302), a file processing module (304), a link editing module (306), a cursor form making module (308), and a link retrieving module (310).

The initialization module (302) displays the initial screen and selects a menu. One of the modules (304, 306, 310) is started by menu selection. The file processing module (304) reads a residents information file (314) and a map file (316), reads and preserves a link information file (318) with residents information and map information, and updates the link management table (312).

The link editing module (306) sets and edits a link with residents information and map information on the screen and loads and updates data in the link management table (312).

The cursor form making module (308) sets the cursor form for setting and editing a link. The link retrieving module (310) displays the area where residents meeting the retrieval conditions are included on the map using the set link information.

According to this embodiment, the link editing module (306) is characterized in that it calls the cursor form making module (308) for link editing and sets the cursor successively.

Figure 7:
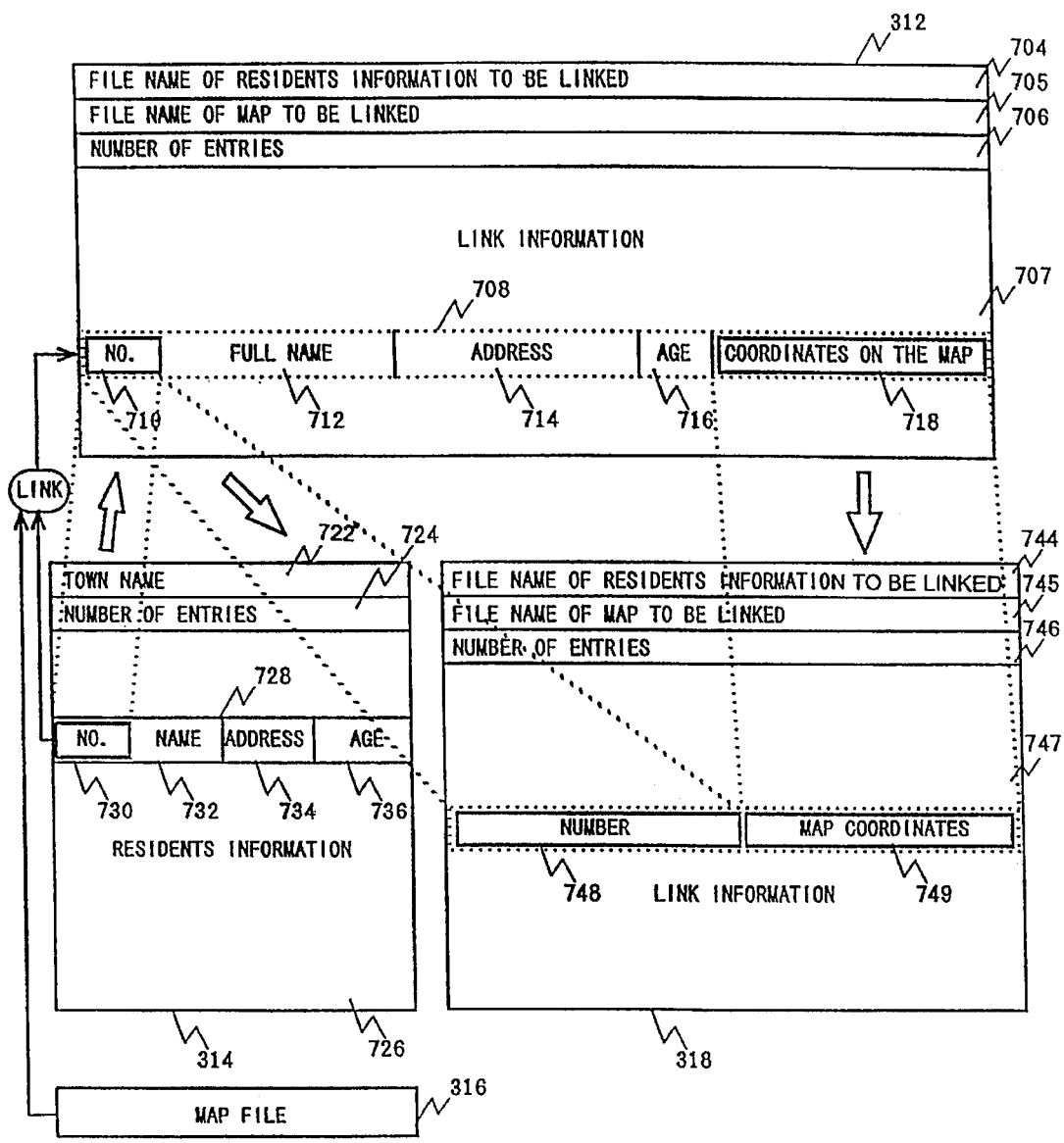
FIG. 7 shows the structure of a table and files which are used in this embodiment.

FIG. 7 shows the structure of a table and files which are used in this embodiment.

The link management table (312) is an operation area for storing the result when the data of the residents information file (314) and the data of the map file (316) which links with the above data correspond to each other respectively on the screen. A set of the number of each entry of the residents information file (314) stored in the link management table (312) and map coordinates obtained from the map file (316) is stored in the link information file (318). As a result, by using the data of the link information file (318), the correspondence between residents information and map information is obtained.

The residents information file (314) consists of the fields of town name (722), number of entries (724), and residents information (726). The town name where residents live is stored in the town name field, and the number of residents which are recorded in the file is stored in the number of entries field (724), and the information of each resident is stored in the residents information field (726) successively. The residents information (726) is a set of a plurality of resident records (728) and the resident records (728) consist of the fields of entry No. (730), full name of resident (732), address of residence place (734), and age (736).

The link management table (312) consists of the fields of file name of residents information to be linked (704), file name of map to be linked (705), number of entries (706), and link information (707). The name of residents information file which is read as an object to be linked is stored in the field of file name of residents information to be linked (704), and the name of map file which is read as an object to be linked is stored in the field of file name of map to be linked (705), and the number of residents which are entered are stored in the field of number of entries (706), and each resident information and residence place link information are stored successively in the link information field (707).

The link information (707) which is a set of a plurality of link information records (708) consists of the fields of entry No. (710), full name of resident (712), address of residence place (714), and age (716) and stores coordinates on the map (718).

The file processing module (304) reads the residents information file (314) and stores the items other than the coordinate information field on the map among the link residents information map file name, number of entries, and link information in the link management table (312).

The link editing module (306) sets the coordinates on the map (718) in the link information field of the resident who sets the link of the link management table (312).

The link information file (318) consists of the fields of file name of residents information to be linked (744), file name of map to be linked (745), number of entries (746), and link information (747). A set of entry No. of resident (748) and coordinates on the map (749) is stored successively in the link information field (747).

Preserving the link information of the link management table (312) in the link information file (318) is also executed by the file processing module (304).

Figure 26:
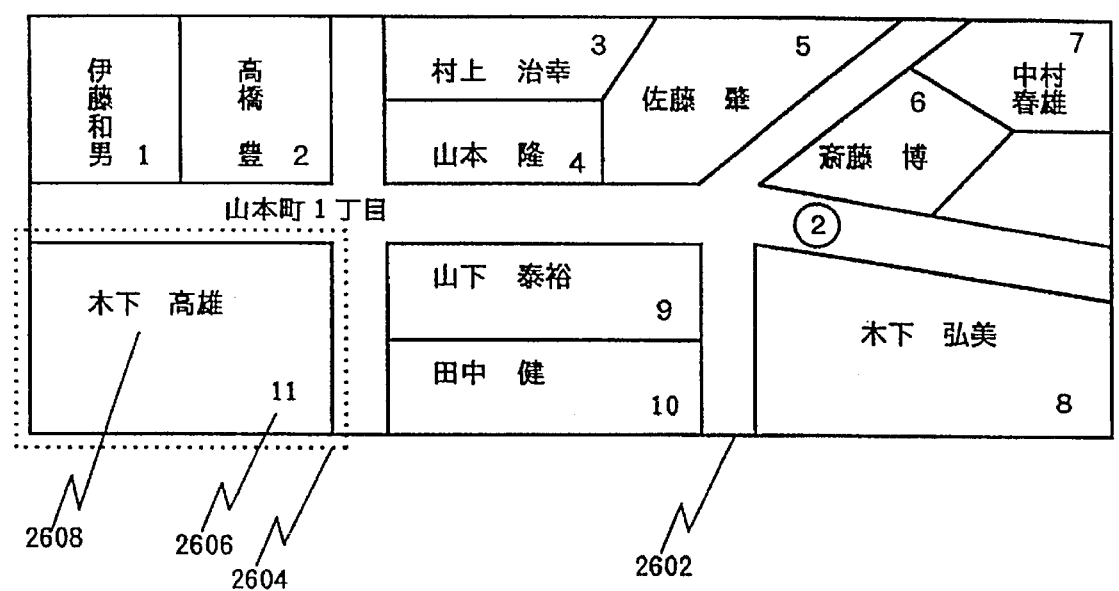
FIG. 26 shows a map example.

FIG. 26 shows an actual example of a map which is used in this embodiment. A map (2602) is stored in the map file (316) as an image data type. In the map (2602), a section (2604) where residents live, an address (2606) thereof, and the name of householder (2608) are entered.

Figure 4:
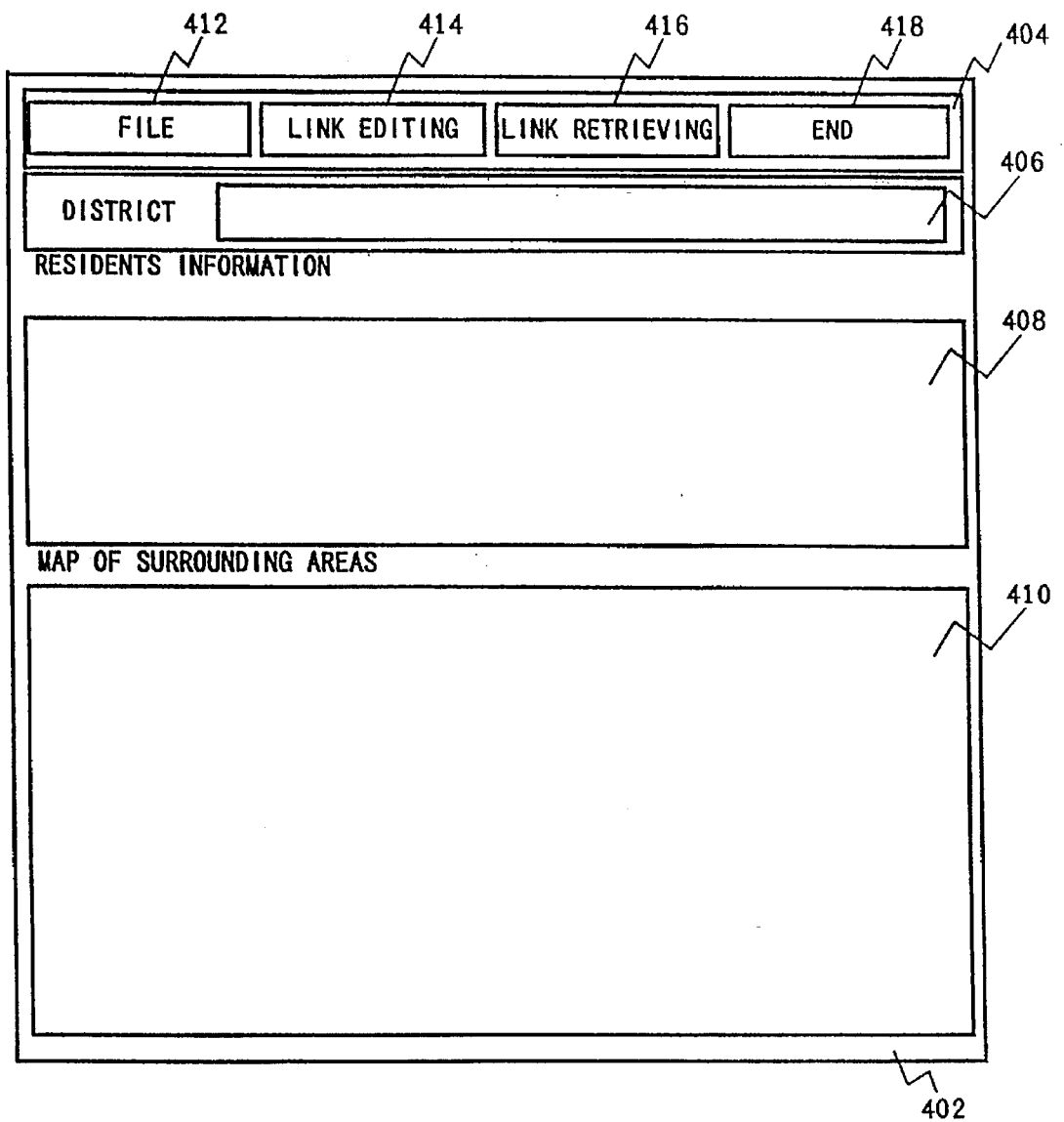
FIG. 4 shows an initial screen of this embodiment.

FIG. 4 shows an initial screen of this embodiment. When the program is started, an initial screen (402) is displayed first. The screen (402) consists of a menu (404), a district display field (406), a residents information display field (408), and a map display field (410). The menu (404) consists of a file processing selection button (412), a link edition selection button (414), a link retrieval selection button (416), and an end button (418). The district display field (406) indicates the district name which is displayed at present, and the residents information display field (408) indicates the residents information in the district, and the map display field (410) indicates the map in the neighborhood of the district.

Figure 5:
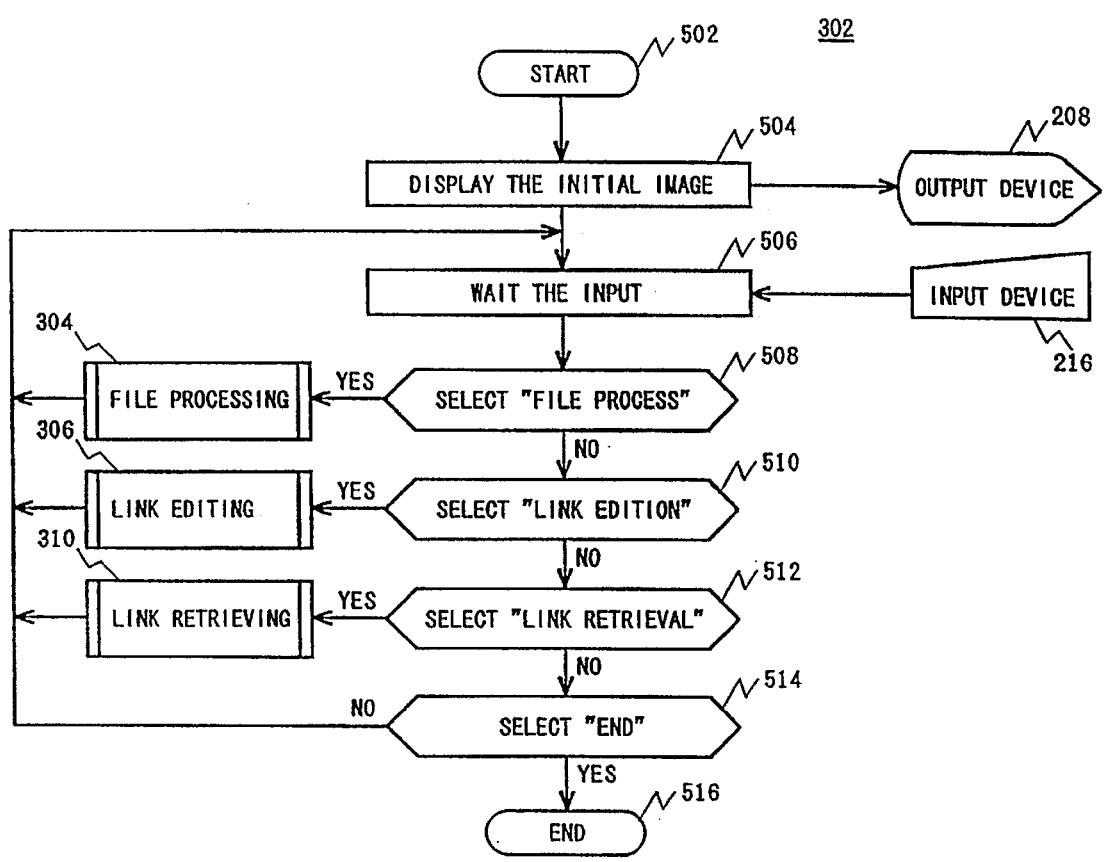
FIG. 5 shows a flow chart of initialization.

FIG. 5 shows a flow chart of the initialization procedure (302). When the program is started (Step 502), the initial image shown in FIG. 4 is displayed on the output device (208) first (Step 504). Then, the program waits input from the user (Step 506). When the file selection button is selected, the file processing module (304) is called (Step 508). When the link edition button is selected, the link editing module (306) is called (Step 510). When the link retrieval button is selected, the link retrieving module (310) is called (Step 512). When the processing of each module ends, the program returns to Step 506 and waits input from the user once again. When the end button is selected (Step 514), the execution of the program ends (Step 516).

Figure 6:
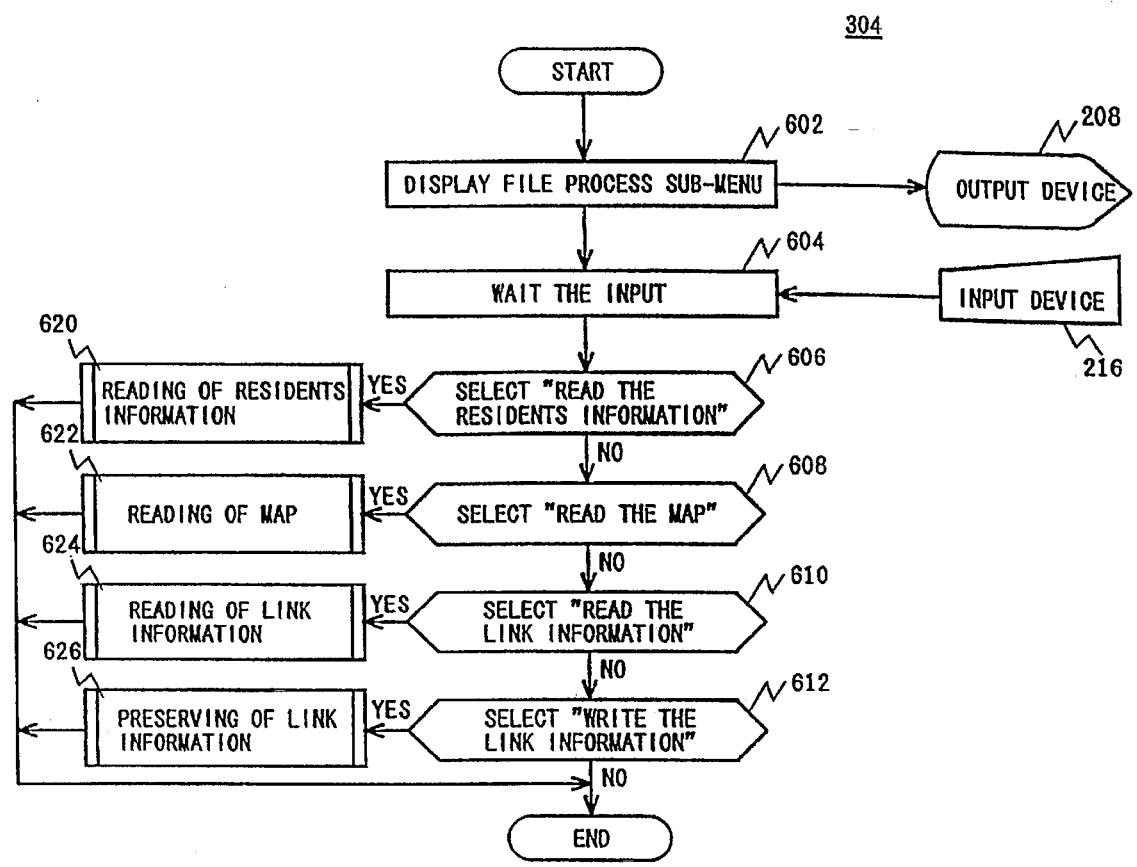
FIG. 6 shows a flow chart of a file processing module.
Figure 8:
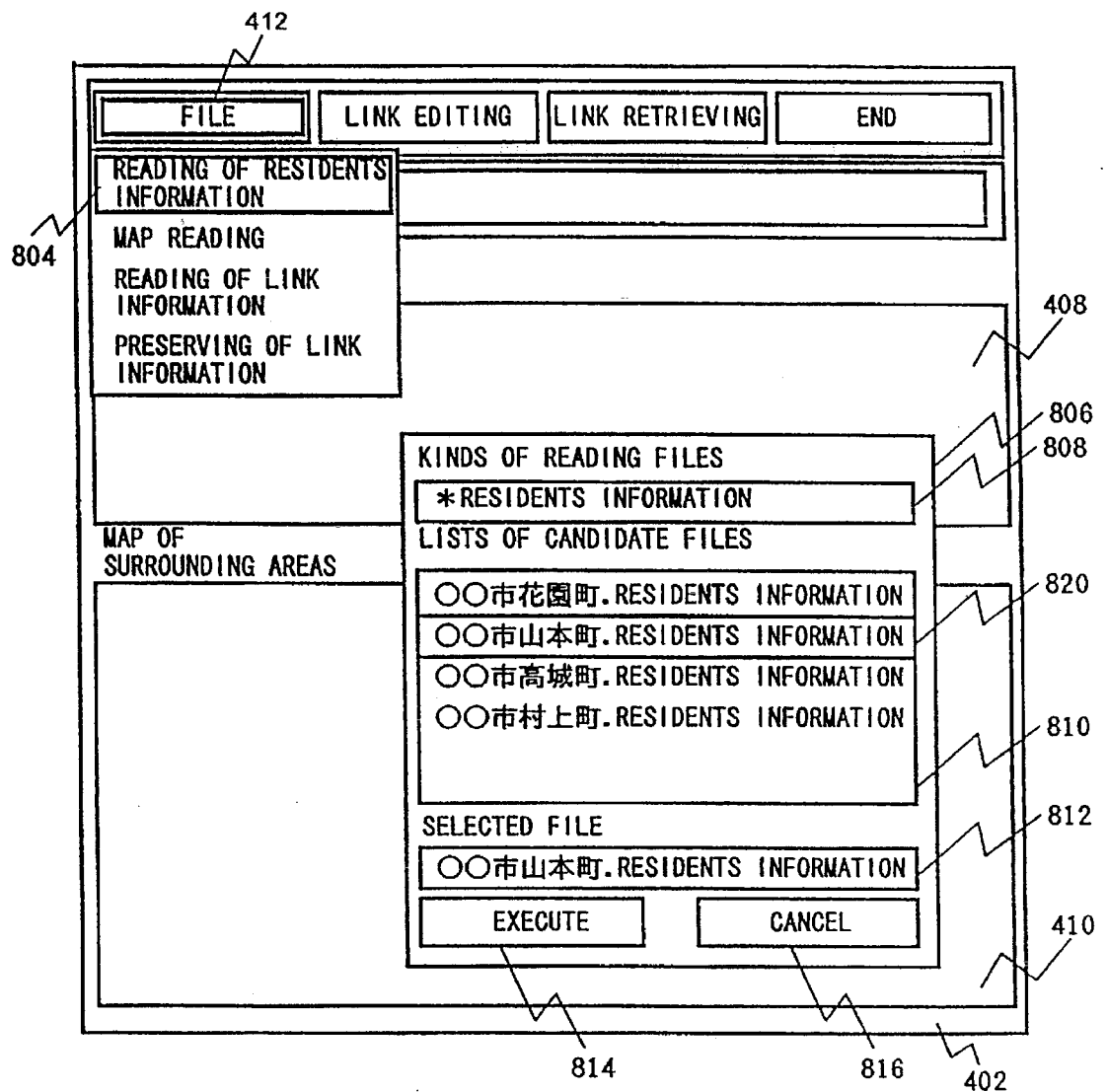
FIG. 8 shows a residents information file selection screen.
Figure 9:
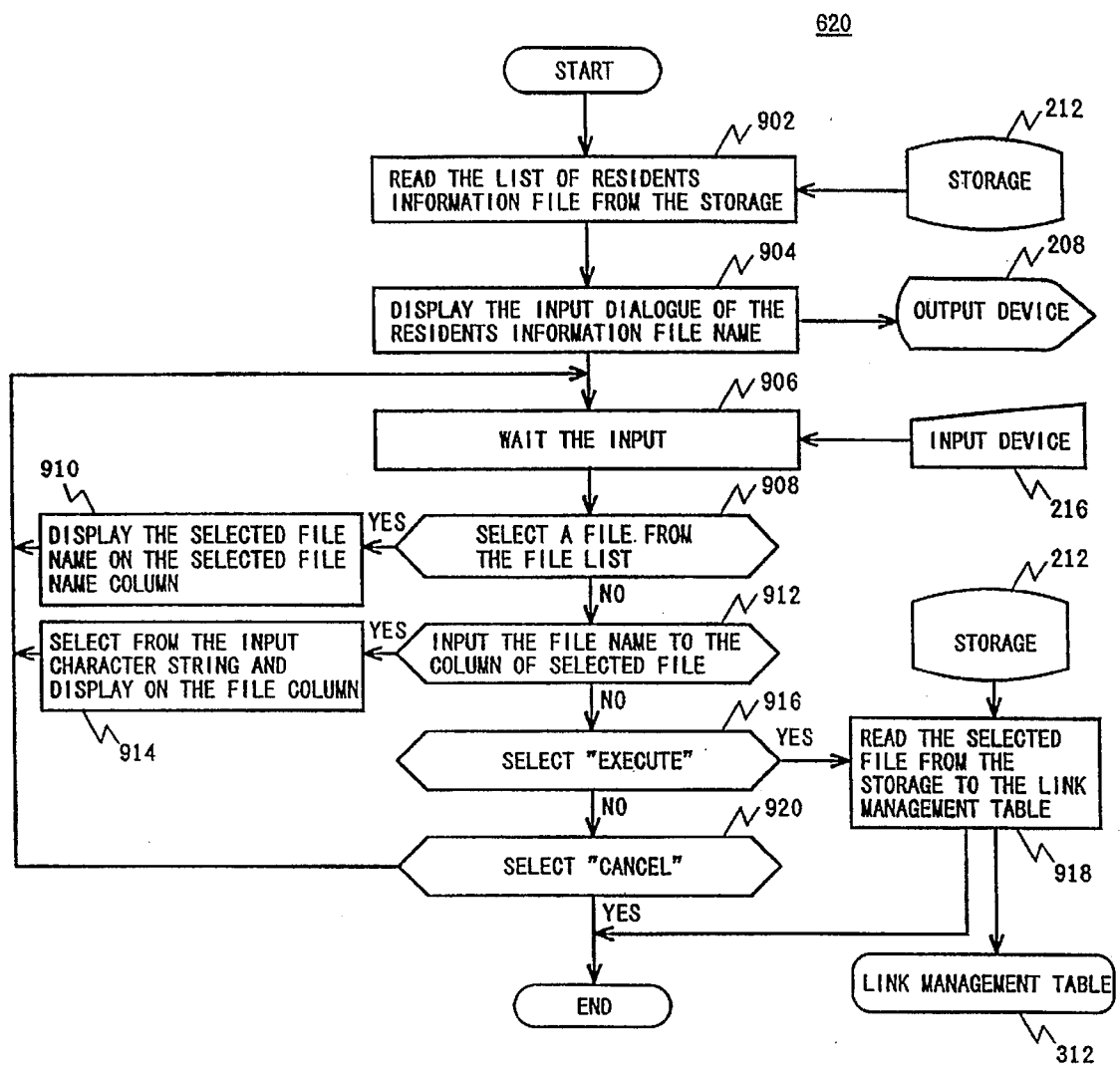
FIG. 9 shows a flow chart of residents information reading.

FIG. 6 shows a flow chart of the file processing module (304). When "file processing" is selected in the flow chart shown in FIG. 5, the file processing module (304) is called, and the file process sub-menu is displayed (Step 602), and the program waits input from the user (Step 604). When "reading of residents information" is selected, a residents information reading module (620) is called (Step 606). When "reading of map" is selected, a map reading module (622) is called (Step 608). When "reading of link information" is selected, a link information reading module is called (Step 624) (Step 610). Furthermore, when "preserving of link information" is selected, a link information preserving module (626) is called (Step 612). When the execution of each module ends or none of the above is inputted, the processing ends. FIG. 9 is a flow chart of the residents information reading module (620) and FIG. 8 shows a residents information file selection screen which is displayed by the processing shown in FIG. 9.

FIG. 9 will be explained with reference to FIG. 8. When a residents information reading button (804) of the file process sub-menu (802) displayed at Step 602 shown in FIG. 6 is selected, the residents information reading module (620) is started.

Firstly, the list of residents information file is read from the disk storage (212) (Step 902) and the input dialogue of the residents information file name (806) is displayed on the basis of the read information (Step 904). The dialogue (806) consists of a kinds of reading files column (808), lists of candidate files (810), a selected file column (812), an Execute button (814), and a Cancel button (816). The kind of file which is read from the disk storage (212) is displayed on the kinds of reading files column (808) and the read file list is displayed in the lists of candidate files (810).

Next, the program waits input from the user (Step 906). When a desired file name (820) is selected from the lists of candidate files (810) (Step 908), the selected file name is displayed on the selected file column (812) (Step 910). When a file name is not selected from the lists of candidate files (810) and the file name is inputted directly on the selected file column (812) (Step 912), the input character string is displayed on the selected file column (812) (Step 914). After the above file name is displayed, the program is returned to Step 906 once again.

Figure 10:
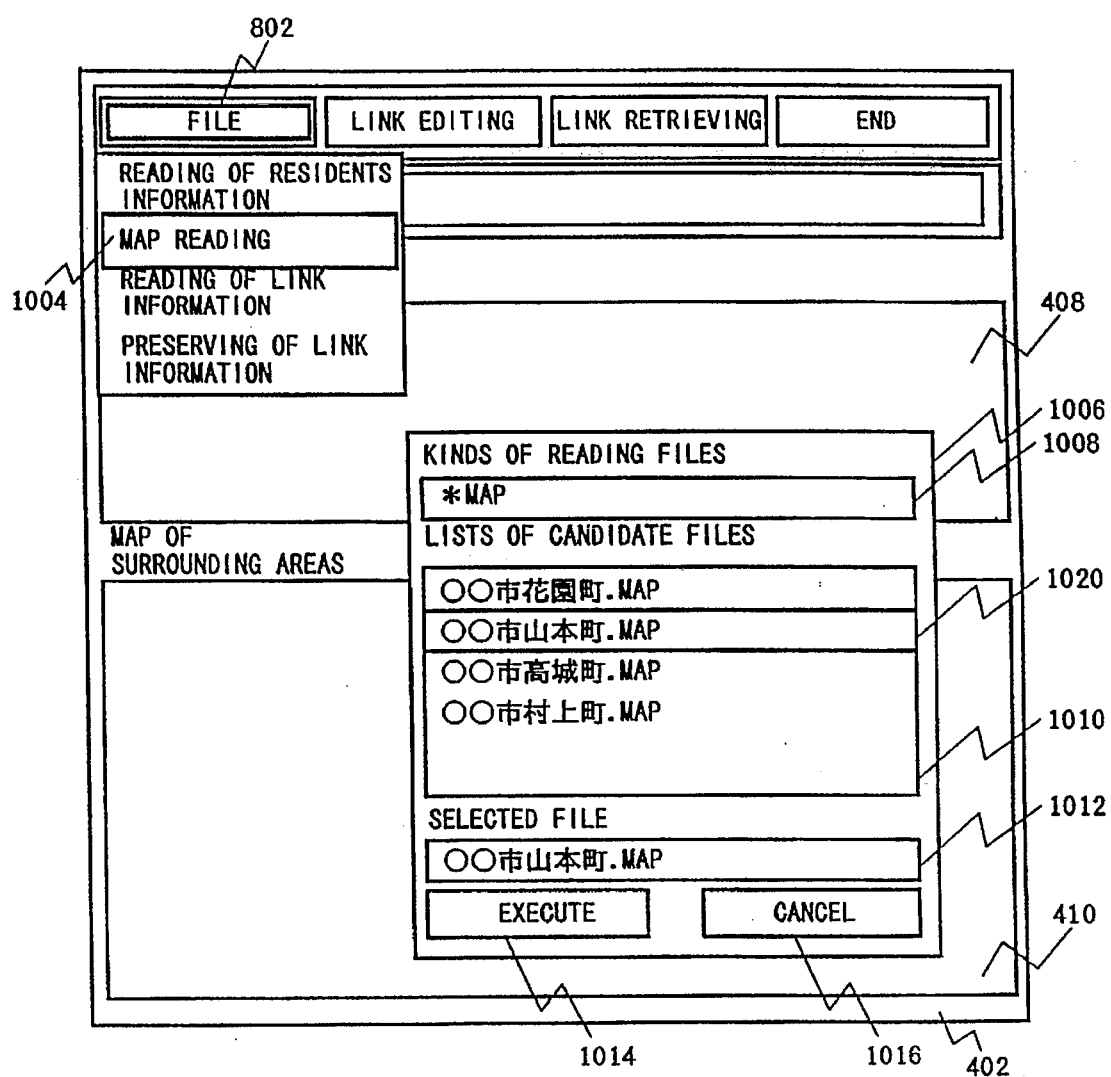
FIG. 10 shows a map file selection screen.
Figure 11:
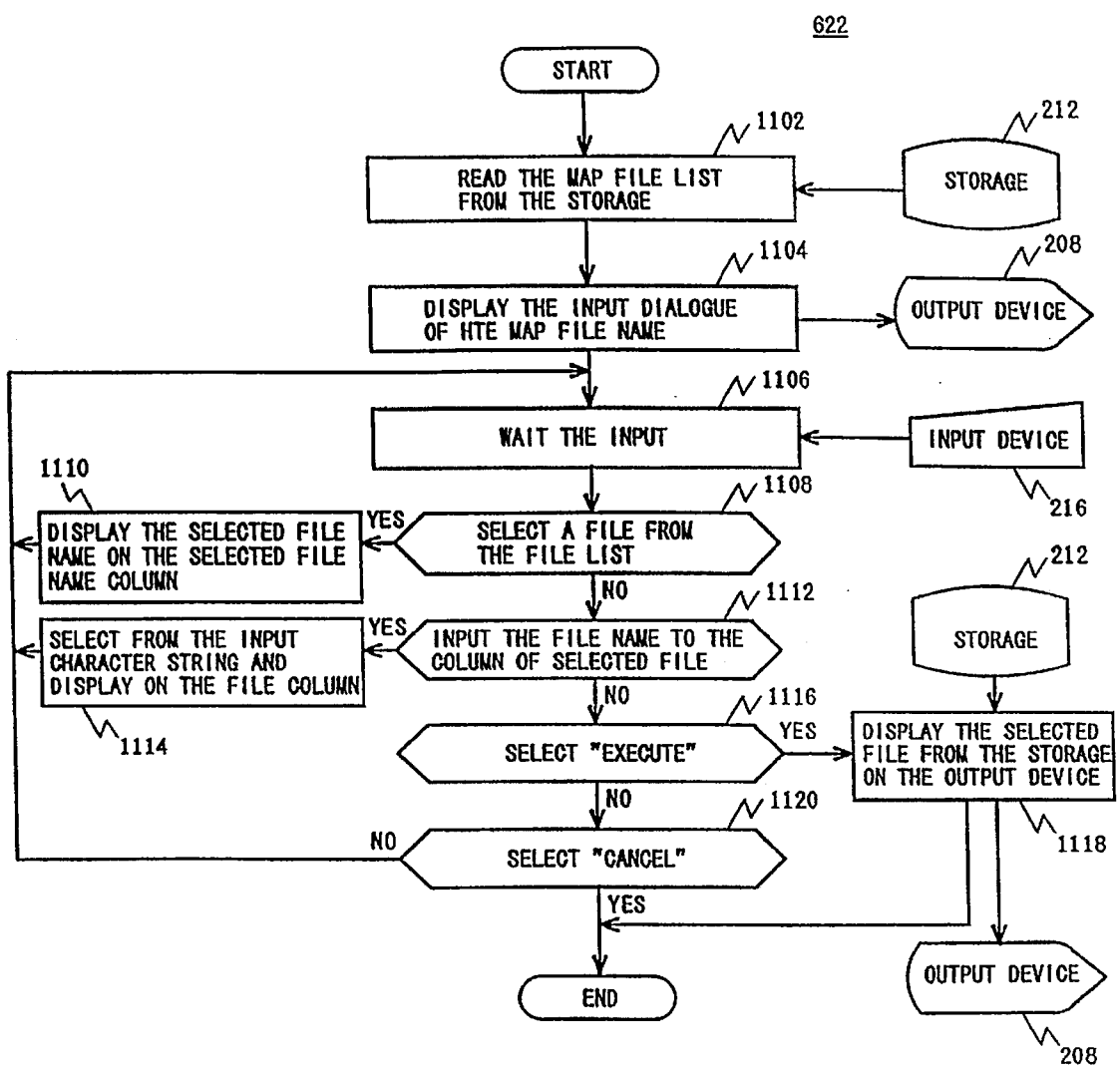
FIG. 11 shows a flow chart of map reading.

When the Execute button (814) is selected (Step 916), the selected file is read from the disk storage (212) into the link management table (312) and the processing ends. When the Cancel button (816) is selected (Step 920), the processing ends with nothing being done. When none of the above is inputted, the program is returned to Step 906 once again. FIG. 11 is a flow chart of the map reading module (622) and FIG. 10 shows a map file selection screen which is displayed by the processing shown in FIG. 11.

FIG. 11 will be explained with reference to FIG. 10. When a map reading button (1004) is selected from the file process sub-menu (802) displayed at Step 602 shown in FIG. 6, the map reading module (622) is started.

Firstly, the map file list is read from the disk storage (212) (Step 1102) and the input dialogue of the map file name (1006) is displayed on the basis of the read information (Step 1104). The dialogue (1006) consists of a kinds of reading files column (1008), lists of candidate files (1010), a selected file column (1012), an Execute button (1014), and a Cancel button (1016). The kind of file which is read from the disk storage (212) is displayed on the kinds of reading files column (1008) and the read file list is displayed in the lists of candidate files (1010).

Next, the program waits input from the user (Step 1106). When a desired file name (1020) is selected from the lists of candidate files (1010) (Step 1108), the selected file name is displayed on the selected file column (1012) (Step 1110). When a file name is not selected from the lists of candidate files (1010) and the file name is inputted directly on the selected file column (1012) (Step 1112), the input character string is displayed on the selected file column (1012) (Step 1114). After the above file name is displayed, the program is returned to Step 1106 once again.

When the Execute button (1014) is selected (Step 1116), the selected file is read from the disk storage (212) and displayed on the output device (208) (Step 1118) and the processing ends. When the Cancel button (1016) is selected (Step 1120), the processing ends with nothing being done. When none of the above is inputted, the program is returned to Step 1106 once again.

Figure 12:
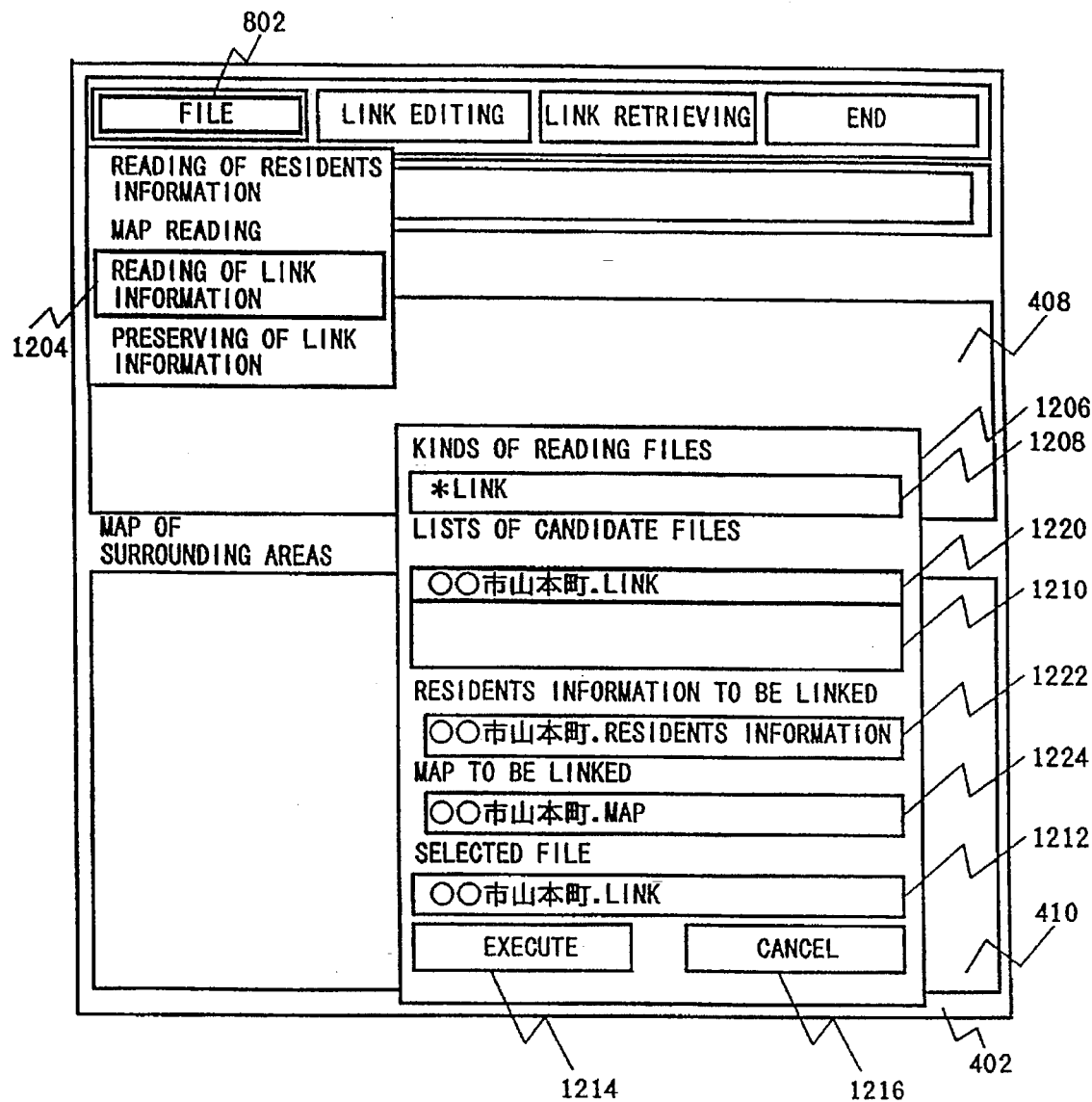
FIG. 12 shows a link information file reading screen.
Figure 13:
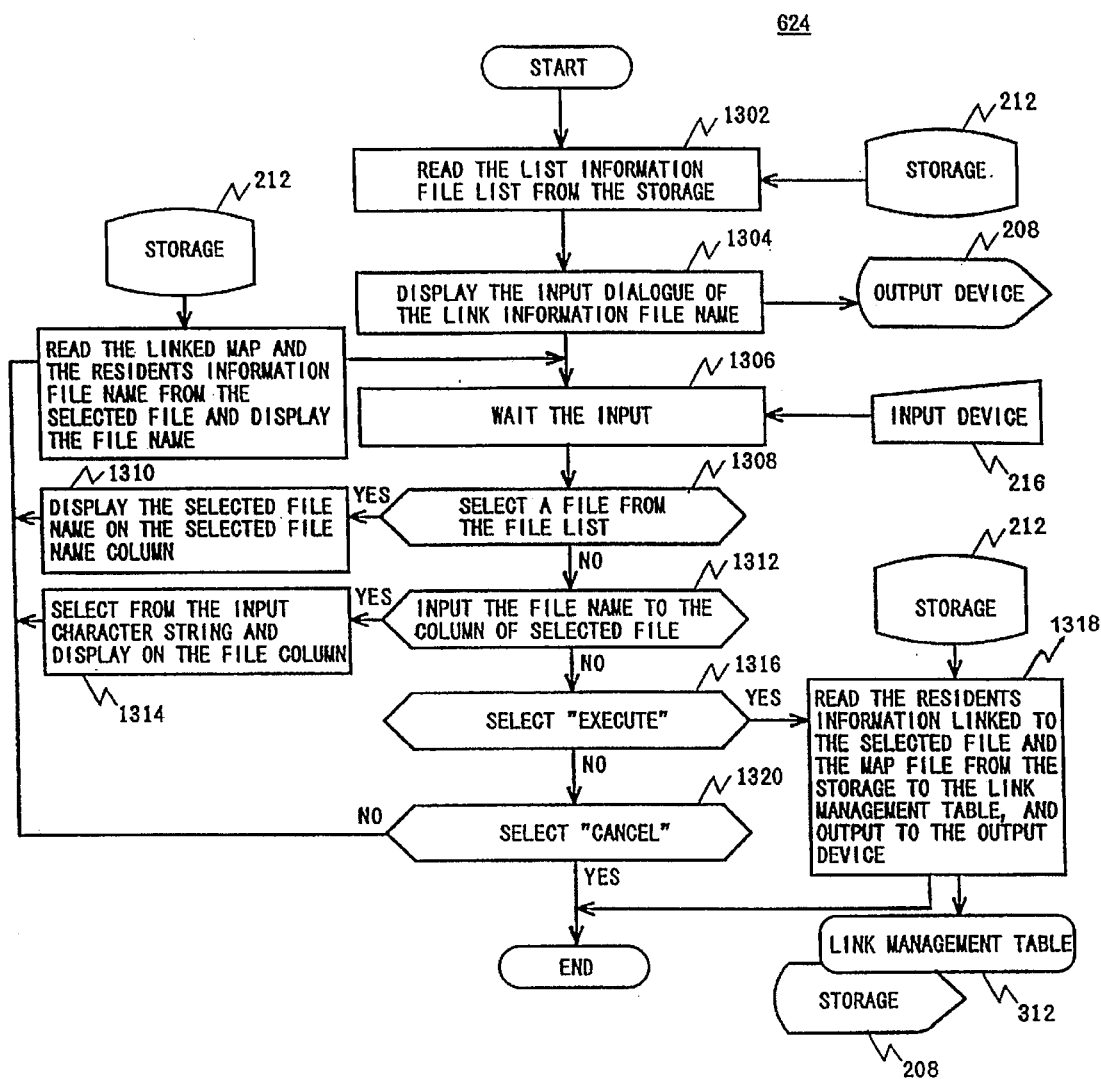
FIG. 13 shows a flow chart of link information reading.

FIG. 13 is a flow chart of the link information reading module (624) and FIG. 12 shows a link information file reading screen which is displayed by the processing shown in FIG. 13. FIG. 13 will be explained with reference to FIG. 12.

When a link information reading button (1204) is selected form the file process sub-menu (802) displayed at Step 602 shown in FIG. 6, the link information reading module (624) is started.

Firstly, when the link information file list is read from the disk storage (212) (Step 1302), the input dialogue of the link information file name (1206) is displayed on the basis of the read information (Step 1304). The dialogue (1206) consists of a kinds of reading files column (1208), lists of candidate files (1210), a column of residents information to be linked (1222), a column of map to be linked (1224), a selected file column (1212), an Execute button (1214), and a Cancel button (1216). The kind of file which is read from the disk storage (212) is displayed on the kinds of reading files column (1208) and the read file list is displayed in the lists of candidate files (1210). The residents information file name of the selected file to be linked and the map file name are displayed on the column of residents information to be linked (1220) and the column of map to be linked (1222) respectively.

Next, the program waits input from the user (Step 1306). When a desired file name (1220) is selected from the lists of candidate files (1210) (Step 1308), the selected file name is displayed on the selected file column (1212) (Step 1310). When a file name is not selected from the lists of candidate files (1210) and the file name is inputted directly on the selected file column (1212) (Step 1312), the input character string is displayed on the selected file column (1212) (Step 1314). After the above file name is displayed, the residents information file name to be linked and map file name are read from the selected file and displayed on the column of residents information to be linked (1220) and the column of map to be linked (1222) respectively and the program is returned to Step 1306 once again.

When the Execute button (1214) is selected (Step 1316), the data of the selected file, of the residents information file to be linked (314), and of the map file (316) is read from the disk storage (212), and the selected file and the residents information file to be linked are written into the link management table, and the contents of the selected file, of the residents information file to be linked, and of the map file are displayed on the output device (208) (Step 1318), and the processing ends. When the Cancel button (1216) is selected (Step 1320), the processing ends with nothing being done. When none of the above is inputted, the program is returned to Step 1306 once again.

Figure 14:
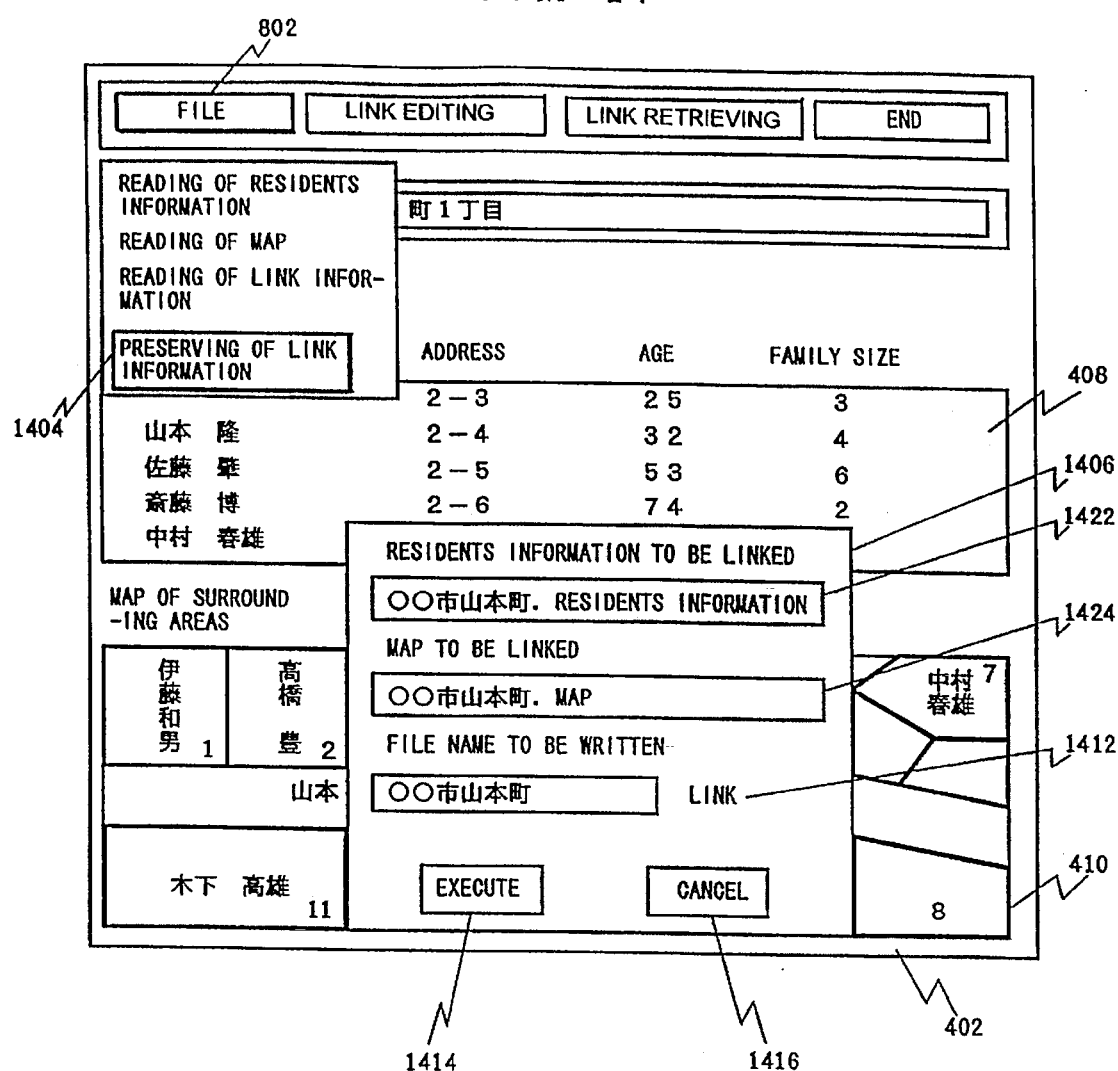
FIG. 14 shows a link information preserving screen.
Figure 15:
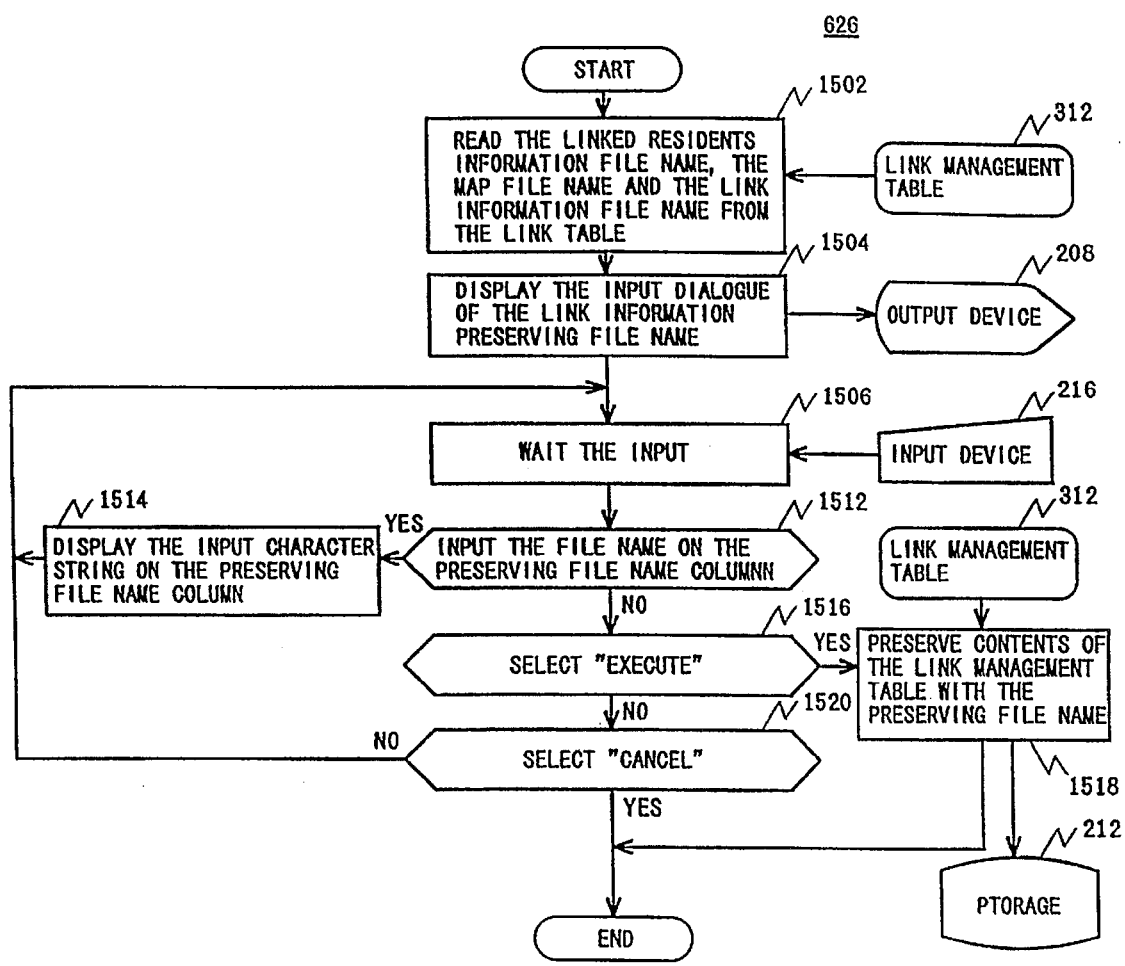
FIG. 15 shows a flow chart of preserving of link information.

FIG. 15 is a flow chart of the link information reading module (626) and FIG. 14 shows a link information file preserving screen which is displayed by the processing shown in FIG. 15. FIG. 15 will be explained with reference to FIG. 14.

When a link information preserving button (1404) is selected from the file process sub-menu (802) displayed at Step 602 shown in FIG. 6, the link information preserving module (626) is started.

Firstly, the residents information file name in which a link is set, the map file name, and the link information file name are read from the link management table (312) (Step 1502) and the input dialogue of the link information preserving file name (1406) is displayed on the basis of the read information (Step 1504). The dialogue (1406) consists of a column of residents information to be linked (1422), a column of map to be linked (1424), a writing file name column (1412), an Execute button (1414), and a Cancel button (1416). The residents information file name of the writing file to be linked which is read from the link management table (312) and the map file name are displayed on the column of residents information to be linked (1422) and the column of map to be linked (1424) respectively. If the link information to be preserved is already preserved once, the file name at that time is displayed on the writing file name column (1412).

Next, the program waits input from the user (Step 1506). When the file name is inputted on the writing file name column (1412) (Step 1512), the input character string is displayed on the writing file name column (1412) (Step 1514) and then the program returns to Step 1506 once again. When the Execute button (1414) is selected (Step 1516), the link information (707 in FIG. 7) is read from the link management table (312) and written into the disk storage (212) with the writing file name (Step 1518) and the processing ends. When the Cancel button (1416) is selected (Step 1520), the processing ends with nothing being done. When none of the above is inputted, the program is returned to Step 1506 once again.

Figure 16:
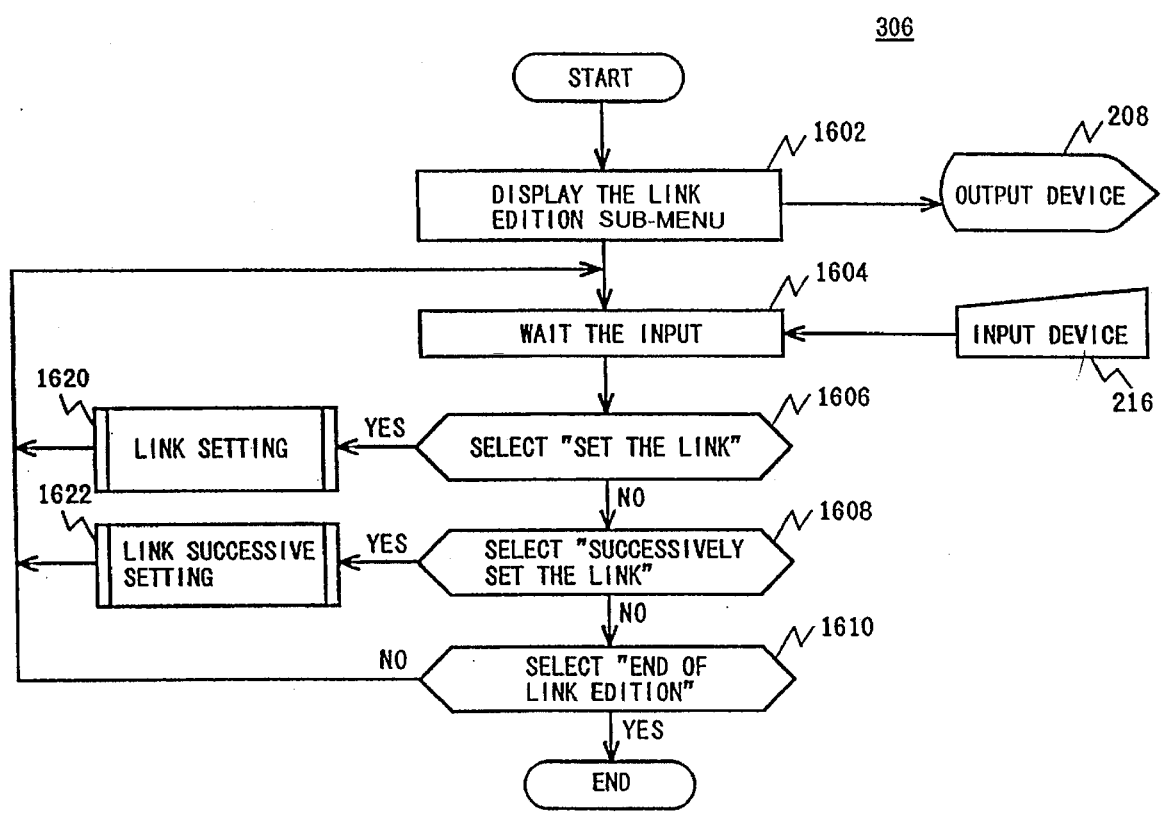
FIG. 16 shows a flow chart of link editing.

FIG. 16 is a flow chart of link editing (306).

When "link editing" is selected in the flow chart shown in FIG. 5, the link editing module is called and the link edition sub-menu is displayed (Step 1602). Thereafter, the program waits input from the user (Step 1604).

When "link setting" is selected, the link setting module (1620) is called (Step 1606) and when "link successive setting" is selected, the link successive setting module (1622) is called (Step 1608). When the execution of the two modules ends, the program returns to Step 1604 and waits input from the user. When "link edition end" is selected, the processing ends (Step 1610).

Figure 18:
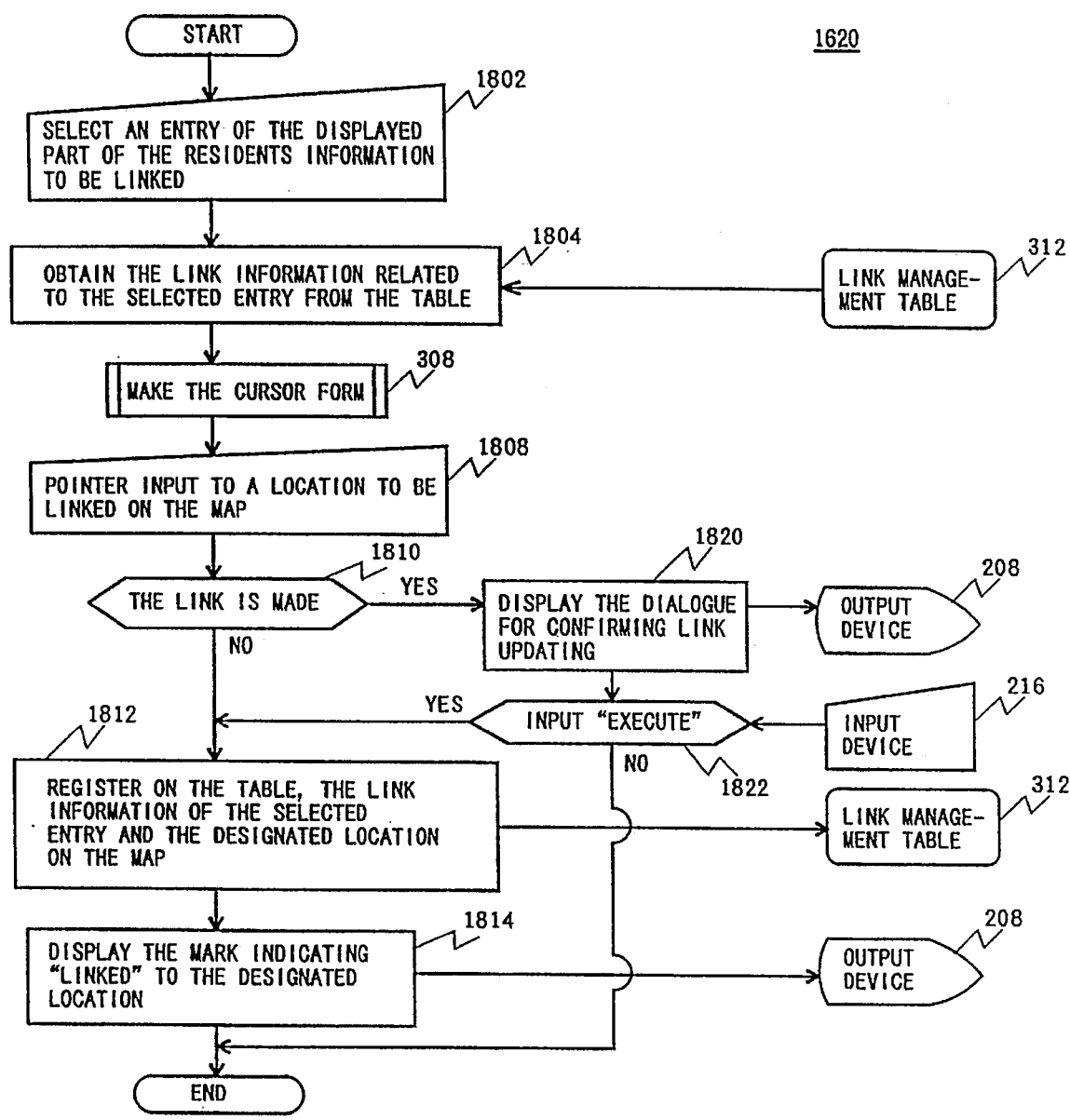
FIG. 18 shows a flow chart of link setting and editing.

FIG. 18 is a flow chart of the link setting module (1620) and FIG. 17 shows a link setting screen which is displayed by the processing shown in FIG. 18. FIG. 18 will be explained with reference to FIG. 17.

When a setting button (1704) is selected from the link edition sub-menu (1702) displayed at Step 1620 shown in FIG. 16, the link setting module (1620) is started.

Firstly, a resident entry (1710) to be linked is selected from the residents information display filed (408) (Step 1802). The link information related to the selected entry (1710) is obtained from the link management table (312) (Step 1804). Next, the cursor form making module (308) is called. The cursor form making module (308) sets the cursor form like the display (1720) in FIG. 17 on the basis of the link information obtained at Step 1802. Details of the cursor form making module (308) will be explained in FIG. 23 and subsequent drawings.

When the cursor form is set, the location to be linked by the user on the map displayed in the map display field (410) is inputted with the cursor (Step 1808). When the location to be linked is inputted, the processing depends on whether the link is made already in the selected resident entry (1710) or not (Step 1810).

If no link is made, the link information of the selected resident entry (1710) and of the inputted location on the map is registered in the link management table (312) (Step 1812), and the mark (1722) indicating "linked" to the designated location is displayed (Step 1814), and the processing ends.

If the link is made already, the dialogue (1730) for inquiring as to whether the previous link setting can be changed is overlaid on the screen (402) (Step 1820) and the program waits input from the user. When the Execute button (1732) is selected by the user (Step 1822), Steps 1812 and 1814 are executed and the processing ends. When the Cancel button (1734) is selected or any other is inputted, the processing ends with nothing being done.

Figure 20:
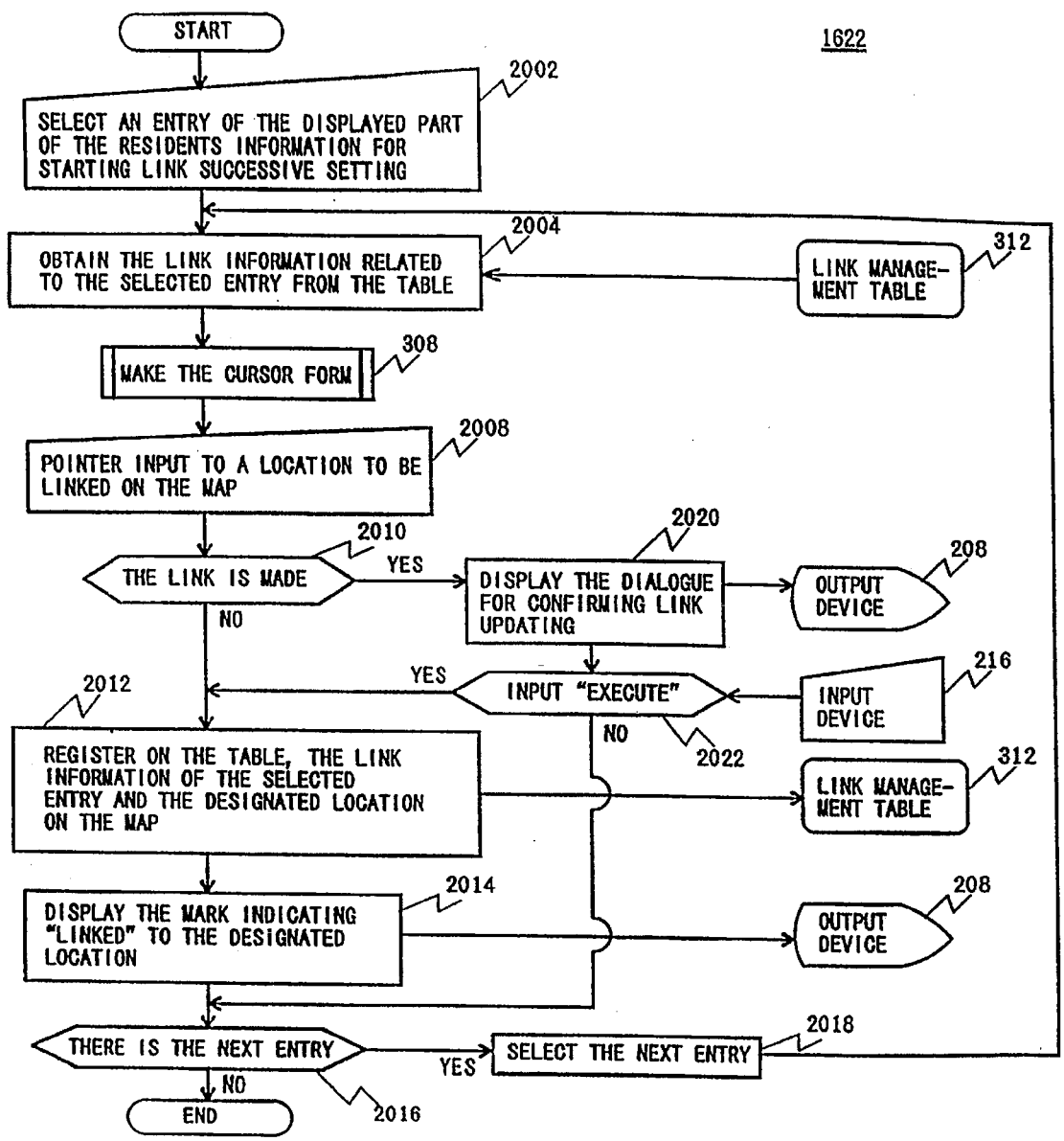
FIG. 20 shows a flow chart of link successive setting and editing.

FIG. 20 is a flow chart of the link successive setting module (1622) and FIG. 19 shows a link successive setting screen which is displayed by the processing shown in FIG. 20. FIG. 20 will be explained with reference to FIG. 19.

When a setting button (1904) is selected from the link edition sub-menu (1702) displayed at Step 1620 shown in FIG. 16, the link successive setting module (1622) is started.

Firstly, a resident entry (1910) for starting link successive setting is selected from the residents information display filed (408) (Step 2002). The link information related to the selected entry (1910) is obtained from the link management table (312) (Step 2004). Next, the cursor form making module (308) is called. The cursor form making module (308) sets the cursor form like the display (1920) in FIG. 19 on the basis of the link information obtained at Step 2002. Details of the cursor form making module (308) will be explained in FIG. 23 and subsequent drawings.

When the cursor form is set, the location to be linked on the map displayed in the map display field (410) is inputted with the cursor (Step 2008). When the location to be linked is inputted, the processing depends on whether the link is made already in the selected resident entry (1910) or not (Step 2010).

If no link is made, the link information of the selected resident entry (1910) and of the inputted location on the map is registered in the link management table (312) (Step 2012), and the mark (1922) indicating "linked" to the designated location is displayed (Step 2014), and the program goes to Step 2016.

If the link is made already, the dialogue (1930) for inquiring as to whether the previous link setting can be changed is overlaid on the screen (402) (Step 2020) and the program waits input from the user. When the Execute button (1932) is selected (Step 2022), Steps 2012 and 2014 are executed and the program goes to Step 2016. When the Cancel button (1934) is selected or any other is inputted, the program goes to Step 2016 without doing anything.

At Step 2016, whether the next entry of residents information exists or not is decided. When the next entry exists, the next entry is selected (Step 2018) and the program returns to Step 2004. When the next entry does not exist, the successive setting ends.

By using the aforementioned link successive setting function, the user can perform the link operation by looking at only the map screen and the operation efficiency can be improved.

Figure 21:
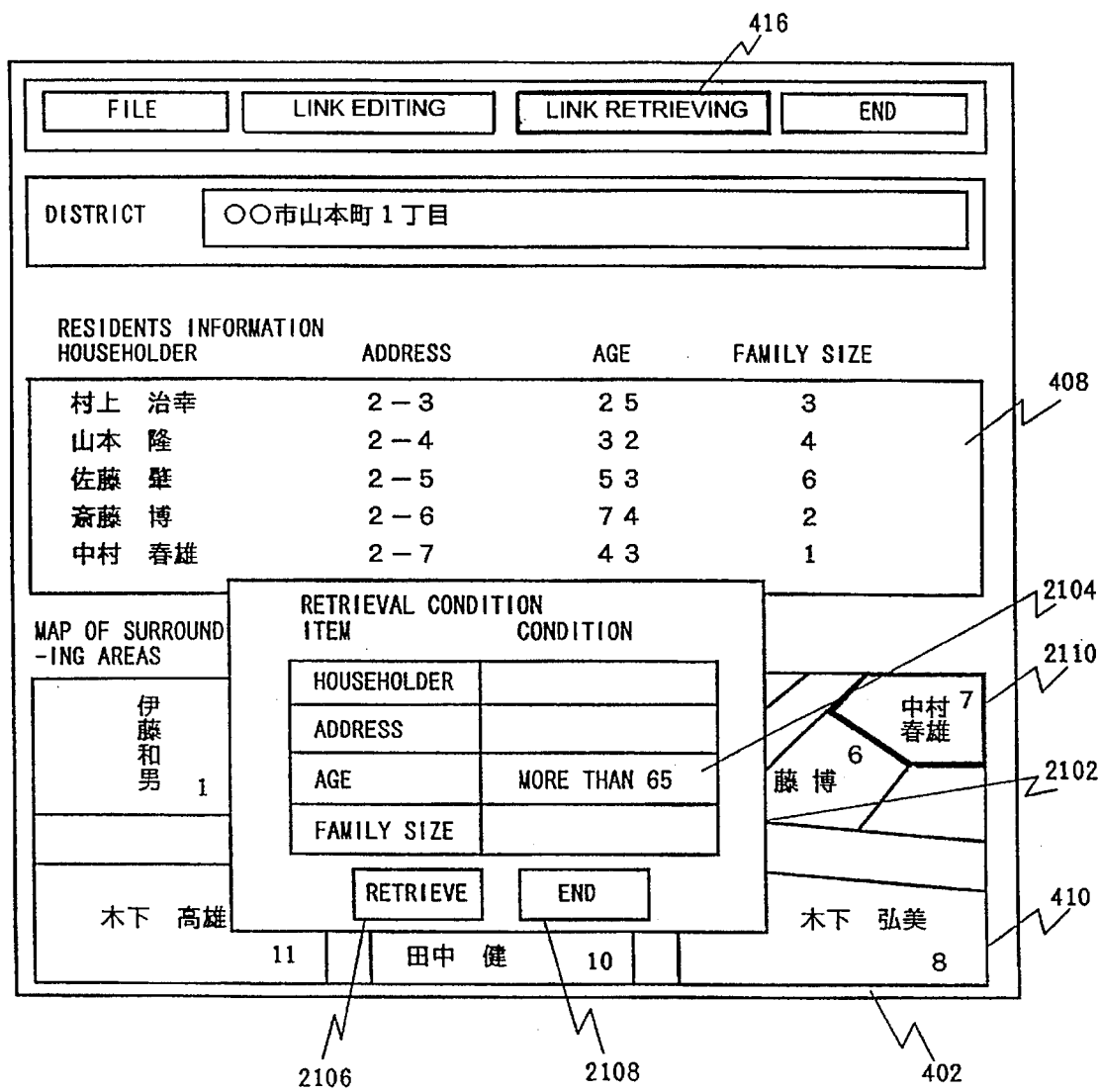
FIG. 21 shows a link retrieval display screen.
Figure 22:
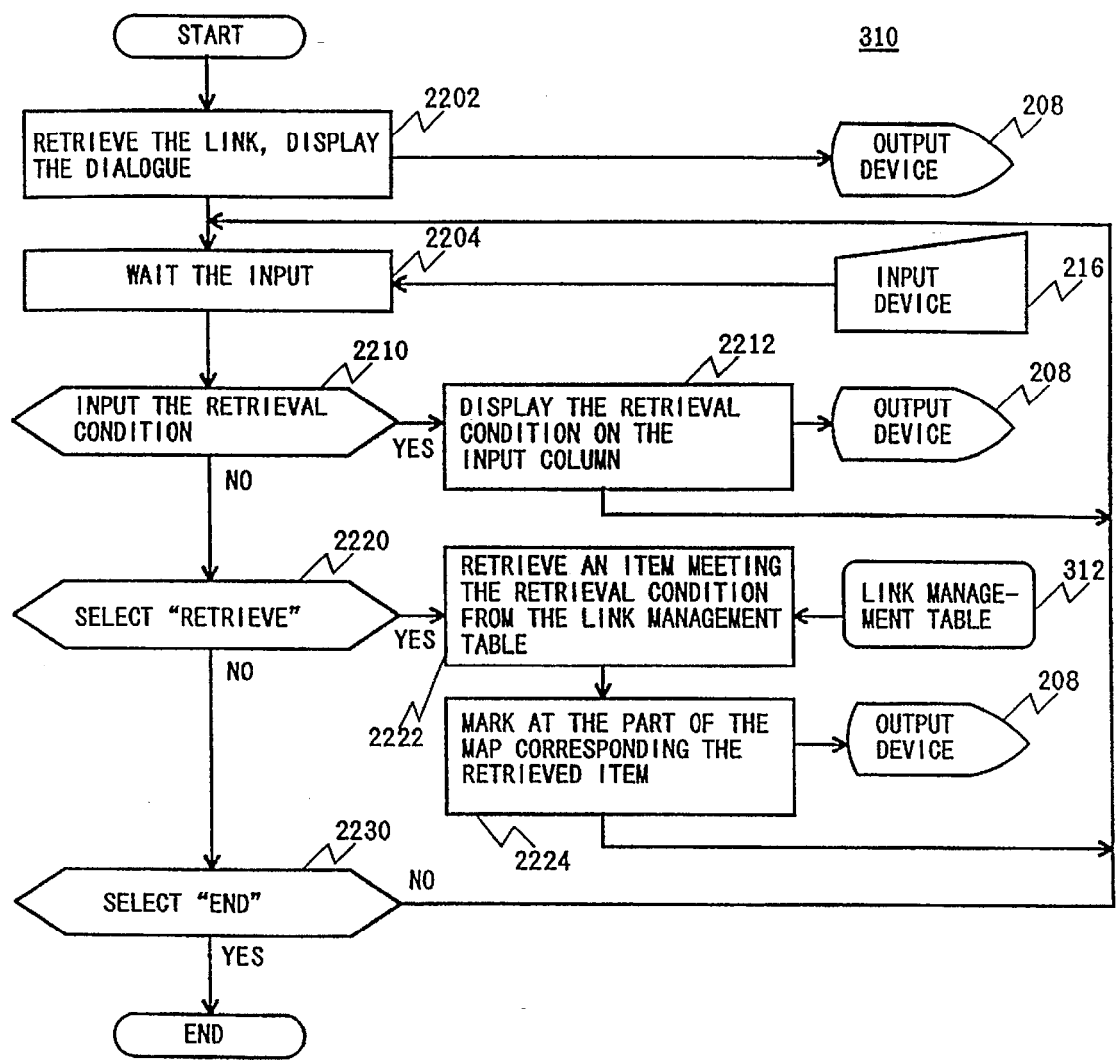
FIG. 22 shows a flow chart of link retrieval.

FIG. 22 is a flow chart of the link retrieving module (310) and FIG. 21 shows a link retrieval display screen which is displayed by the processing shown in FIG. 22. FIG. 22 will be explained with reference to FIG. 21.

When the link retrieval selection button (416) shown in FIG. 4 is selected, the link retrieving module (310) is started.

Firstly, a dialogue of link retrieval (2102) is displayed (Step 2202). The dialogue (2102) consists of a retrieval condition column (2104), a Retrieve button (2106), and an End button (2108).

Next, the program waits input from the user (Step 2204). When the retrieval condition is inputted (Step 2210), the input character string is displayed on the retrieval condition column (Step 2212) and the program returns to Step 2204. When the Retrieve button (2106) is selected (Step 2220), a resident entry meeting the inputted retrieval condition is retrieved from the link management table (312) (Step 2222). Next, at the link setting location on the map which corresponds to the retrieved resident entry, for example, the mark (2110) shown in FIG. 21 is displayed (Step 2224) and the program returns to Step 2204. When the End button (2108) is selected (Step 2230), the processing ends. When any other is inputted, the program returns to Step 2204 without doing anything.

Figure 23:
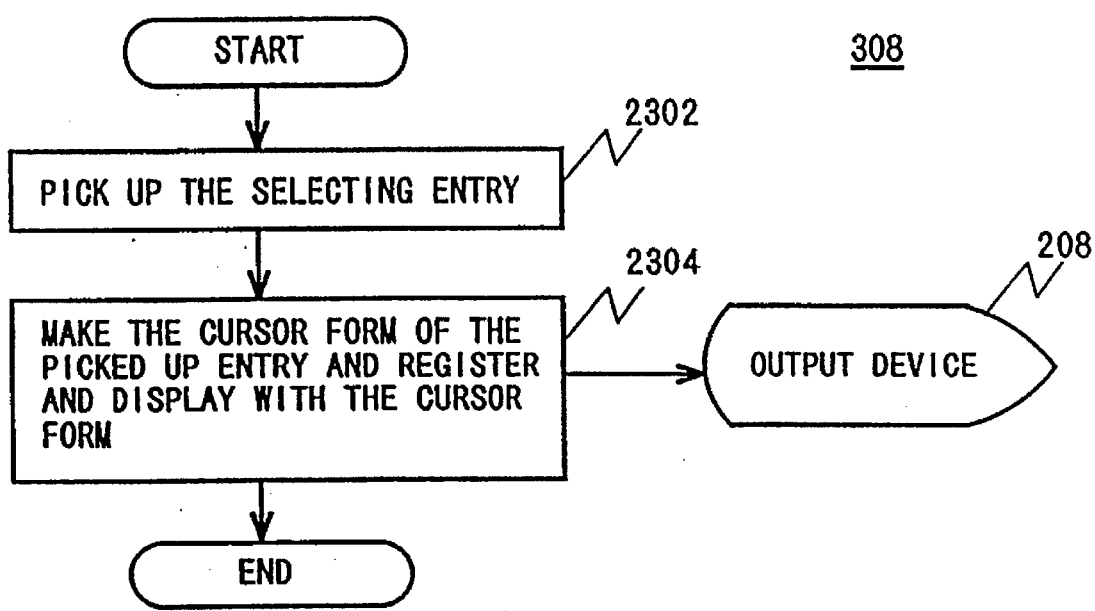
FIG. 23 shows a flow chart of the first embodiment of cursor form making.

FIG. 23 is a flow chart of the first embodiment of the cursor form making module (308). The cursor form making module (308) is called from the link setting module (1620) or link successive setting module (1622) for link editing.

Firstly, the resident entry selected in the link setting module (1620) or link successive setting module (1622) is picked up (Step 2302). Next, the householder name of residents is set as a character string to be used for cursor display and the character string is converted to image data, stored in the cursor form data storage region of the memory, and displayed on the output device (208) (Step 2304).

Figure 25:
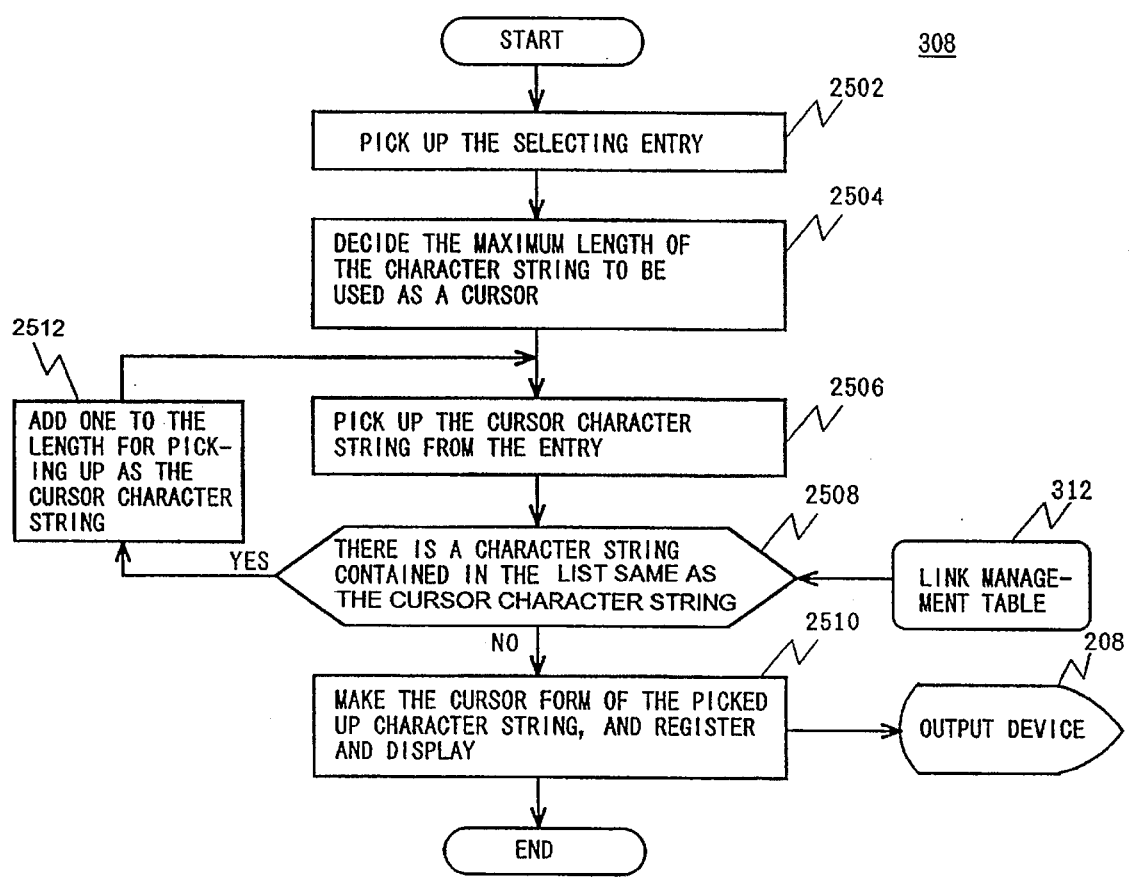
FIG. 25 shows a flow chart of the second embodiment of cursor form making.

FIG. 24 shows the second embodiment in which the number of characters included in the cursor form is restricted and FIG. 25 shows a flow chart of the second embodiment of cursor form making (308).

Firstly, the resident entry (2402) selected in the link setting module (1620) or link successive setting module (1622) is picked up (Step 2502).

Next, the maximum length of the character string to be used as a cursor is decided by designation of the user (Step 2504). In the embodiment in FIG. 24, the maximum length is 2. The maximum length is not restricted to 2 and may be decided depending on the case. For example, when the entry item is a character string consisting of alphabetic characters, the maximum length is set to about 10 characters.

When setting a character string to be used as a cursor, the character string of the maximum length is picked up from the selected resident entry (2402) first (Step 2506). In this case, when the character string of the same length is picked up from the link management table (312), whether there is a character string which is the same as the character string picked up from the selected entry is checked (Step 2508). When there are other character strings which are the same as the selected character string, the maximum length to be picked up as a cursor character string is increased by one (Step 2512), and the program returns to Step 2506, and the above processing is repeated until the character strings which are the same as the selected character string are exhausted.

When the maximum length is set to 2 in FIG. 24, the character string in the entry (2404) is the same as that in the selected entry (2402). Therefore, the maximum length is increased to 3. As a result, the cursor (2406) shown in FIG. 24 is displayed.

When there are no other same character strings, the pickedup character string is converted to image data, registered in the cursor form data storage region of the memory, and displayed on the output device (208) (Step 2510).

According to the second embodiment, the cursor length is not long unnecessarily, so that there is an advantage that it is rare that the cursor is obstructive on the screen because it is large excessively.

Figure 27:
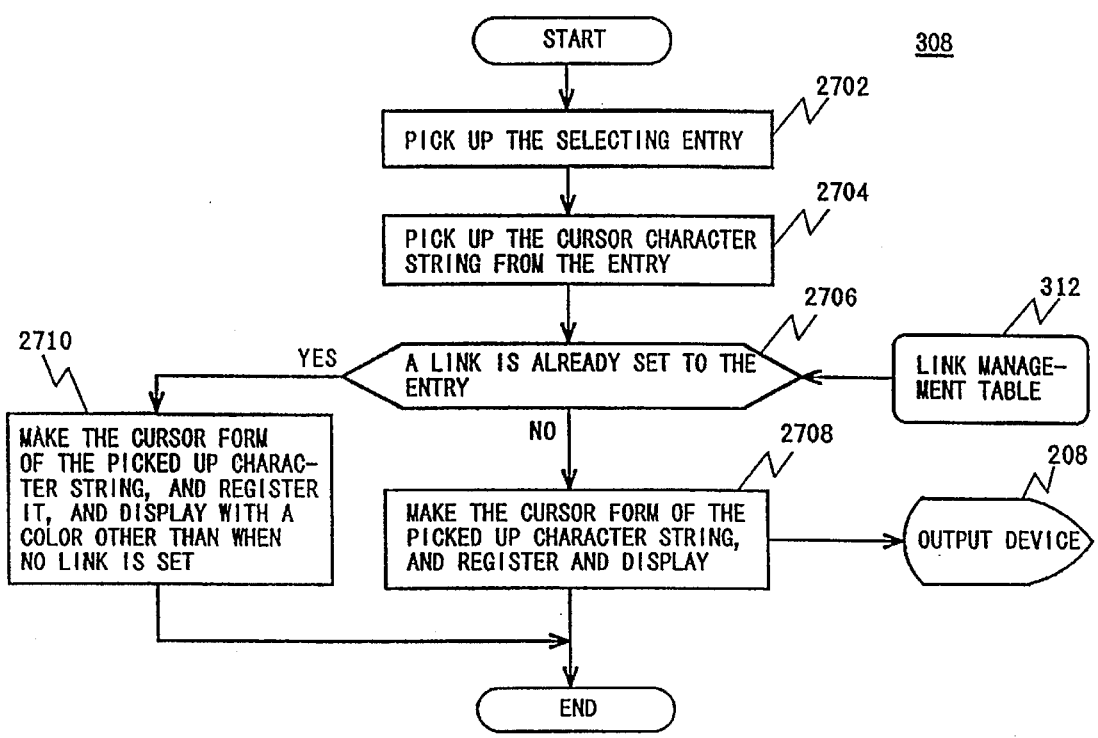
FIG. 27 shows a flow chart of the third embodiment of cursor form making.

FIG. 27 shows a flow chart of the third embodiment of cursor form making (308) for changing the cursor display color according to the presence or absence of link setting.

Firstly, the resident entry selected in the link setting module (1620) or link successive setting module (1622) is picked up (Step 2702, 2704). Whether a link is already set to the selected resident entry is checked (Step 2706). When no link is set to the selected entry, the picked-up character string is registered as a cursor form, and the cursor is displayed in the same way as with the above (Step 2708), and the processing ends. When a link is already set to the selected resident entry, the processing up to registration is the same as above, though the cursor is displayed in a color which is different from that when no link is set (Step 2710) and the processing ends. For example, when no link is set, the cursor is displayed in blue. When a link is already set, the cursor is displayed in red.

According to the third embodiment, at the point of time when the resident entry to which a link is to be set is selected by the user, whether a link is set already or not is found. Therefore, the resident entry to which a link is already set can be prevented from double setting.

Figure 28:
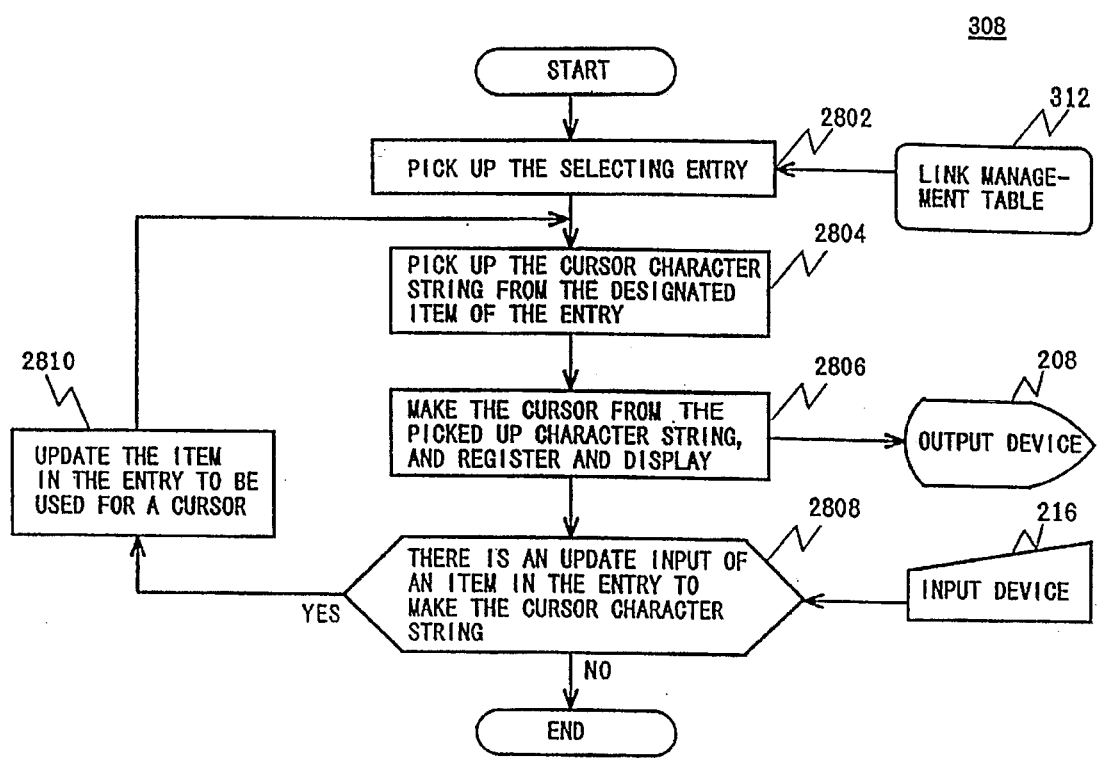
FIG. 28 shows a flow chart of the fourth embodiment of cursor form making.

FIG. 28 shows a flow chart of the fourth embodiment of cursor form making (308) in which the item to be displayed on the cursor can be changed by the user.

Firstly, the resident entry selected in the link setting module (1620) or link successive setting module (1622) is picked up (Step 2802). The character string to be displayed on the cursor is picked up from the designated item of the selected resident entry (Step 2804). For example, a case that the name of householder is set as a designated item will be considered. The picked-up character string is converted to image data, registered in the cursor form data storage region of the memory, and displayed on the output device (208) (Step 2806). Next, whether there is a data update input for an item in the entry which is displayed in the cursor character string is decided (Step 2808). When there is a data update input, the item in the entry which is to be used for the cursor is updated by the user (Step 2810) and the program returns to Step 2804. For example, the item is updated from householder name to address. When there is no data update input, the processing ends.

According to the fourth embodiment, when an attempt is made to search the cursor display information for coordinates on the map which a link is to be set to, the cursor display information can be switched to another related information and a link can be set easily.

Application examples to a map information system are explained above. However, the present invention is not restricted to such a system and can be applied to an image information retrieving system.

By converting a character string of a predetermined item in the entry selected so as to set a link to image data and displaying it on the cursor, when designating a character string which is the same as the character string displayed on the display screen by the cursor, the character string on the cursor and the character string displayed on the display screen can be seen at a short distance. As a result, the sight line of the user moves little, and a location where a link is to be set can be selected correctly and can be designated quickly, and the time required to set a link can be shortened.

We claim:

1. A method for making a cursor form, by using a processor connected with an input device, a display device and a storage device, for linking a part of an image displayed on said display device with one of a plurality of entries of table data stored in said storage device, the method comprising the steps of:

a) displaying on said display device said image and said table data including a plurality of entries;

b) reading from said storage device data of a selected entry, said selected entry being selected from said table data by using said input device;

c) generating said cursor form by converting a character string included in a predetermined item of said selected entry to cursor form data;

d) obtaining location information for a part of said image including a same mark as that of said character string by designating a location including said same mark with said cursor form displayed on said display device, said location being previously undetermined; and e) setting a link between said selected entry and said obtained location information.

2. The method of claim 1 wherein said step c) further comprises the steps of:

f) storing the link, set in step e), in a link information file;

g) deciding whether links are already set to said selected entry based on links stored in the link information file in said step f); and h) changing cursor display status of said cursor form data displayed on said display device according to whether a link is set.

3. The method of claim 1 wherein said step c), further comprises the steps of:

i) if an instruction for changing said predetermined item of said selected entry to a second item is inputted from said input device, generating said cursor form by converting the character string of the second item designated by said change instruction included in said selected entry to cursor form data.

4. The method of claim 3, wherein said image is map data and said table data is residents information.

5. The method of claim 1 wherein said generated cursor form can obtain location information in any area of the display of said display device.

6. A method for making a cursor form, by using a processor connected with an input device, a display device and a storage device, for linking a part of an image displayed on said display device with one of a plurality of entries of table data stored in said storage device, the method comprising the steps of:

a) displaying on said display device said image and said table data including a plurality of entries;

b) reading from said storage device data of a selected entry, said selected entry being selected from said table data by using said input device;

c) generating a cursor form by converting a character string included in a predetermined item of said selected entry to cursor form data, wherein said step of generating a cursor form comprises the substeps of:

c1) obtaining said character string, including a predetermined number of characters, from the beginning of the character string of said predetermined item included in said selected entry;

c2) comparing said obtained character string with character strings of the data included in the predetermined item of other entries in said table data successively;

c3) if the same character string is not found in said other entries, generating said cursor form by converting said obtained character string to cursor form data; and c4) if the character string is found in said other entries, incrementing the predetermined number of obtained characters by one until said obtained character string differs from the character strings of said other matching entries, and generating said cursor form by converting said obtained character string to cursor form data;

d) obtaining location information for a part of said image including a same mark as that of said character string by designating a location including said same mark with said cursor form displayed on said display device, said location being previously undetermined; and e) setting a link between said selected entry and said obtained location information.

* * * * *